(12) United States Patent
Jette et al.

(10) Patent No.: US 10,793,119 B2
(45) Date of Patent: Oct. 6, 2020

(54) BIDIRECTIONAL WHEEL CHOCK RESTRAINT SYSTEM

(71) Applicant: 9172-9863 QUEBEC INC., Terrebonne (CA)

(72) Inventors: Gaetan Jette, Mascouche (CA); Gregory Palmer, Mascouche (CA); Daniel Grothe, Terrebonne (CA); Etienne Ayotte, Repentigny (CA); Martin Levesque, Montreal (CA)

(73) Assignee: 9172-9863 QUEBEC INC., Terrebonne, Quebec (CA)

( * ) Notice: Subject to any disclaimer, the term of this patent is extended or adjusted under 35 U.S.C. 154(b) by 0 days.

(21) Appl. No.: 15/829,795

(22) Filed: Dec. 1, 2017

(65) Prior Publication Data
US 2018/0086320 A1   Mar. 29, 2018

Related U.S. Application Data

(63) Continuation of application No. PCT/CA2016/050634, filed on Jun. 3, 2016.

(60) Provisional application No. 62/170,565, filed on Jun. 3, 2015.

(51) Int. Cl.
*B60T 3/00* (2006.01)
*B65G 69/00* (2006.01)
*B60P 3/077* (2006.01)

(52) U.S. Cl.
CPC ............... *B60T 3/00* (2013.01); *B60P 3/077* (2013.01); *B65G 69/005* (2013.01)

(58) Field of Classification Search
CPC ....... B60T 3/00; B65G 69/003; B65G 69/005; B64F 1/16
See application file for complete search history.

(56) References Cited

U.S. PATENT DOCUMENTS

| | | | |
|---|---|---|---|
| 2,316,178 A | 4/1943 | Morgensen, Jr. | |
| 2,413,744 A * | 1/1947 | Carter | B60P 7/0892 188/32 |
| 2,771,162 A | 11/1956 | Marsh | |
| 2,858,905 A * | 11/1958 | Fahland | B60T 3/00 410/30 |

(Continued)

FOREIGN PATENT DOCUMENTS

| | | |
|---|---|---|
| CA | 2694436 A1 | 8/2011 |
| DE | 609179 A | 2/1935 |

(Continued)

OTHER PUBLICATIONS

Machine translation in English of EP0128992.

(Continued)

*Primary Examiner* — Nicholas J Lane
(74) *Attorney, Agent, or Firm* — IPAXIO S.E.N.C.

(57) ABSTRACT

The bidirectional wheel chock restraint system is used for preventing a parked vehicle from moving both in a forward direction and a rearward direction. The restraint system includes an elongated ground-anchored base plate having a plurality of stoppers that are transversally-disposed over the base plate and that are spaced apart from one another along a longitudinal axis. Depending on the implementation, the restraint system also include either a single double-sided wheel chock or two single-sided wheel chocks.

20 Claims, 29 Drawing Sheets

(56) References Cited

U.S. PATENT DOCUMENTS

| | | | |
|---|---|---|---|
| 2,954,101 A | 9/1960 | Corson | |
| 3,065,827 A | 11/1962 | Timbers | |
| 3,074,569 A | 1/1963 | Ajero | |
| 3,077,247 A | 2/1963 | West et al. | |
| 3,119,466 A | 1/1964 | Gilson | |
| 3,120,292 A | 2/1964 | Rambat | |
| 3,157,194 A | 11/1964 | Stolte | |
| 3,189,127 A | 6/1965 | Karnow et al. | |
| 3,258,088 A | 6/1966 | Bowen | |
| 3,321,046 A | 5/1967 | Cooper | |
| 3,425,517 A | 2/1969 | Speir | |
| 3,542,157 A | 11/1970 | Noah | |
| 3,581,846 A | 6/1971 | Janus | |
| 3,666,119 A | 5/1972 | Parsons | |
| 3,695,394 A | 10/1972 | Carpenter | |
| 3,700,077 A | 10/1972 | Harder | |
| 3,734,241 A | 5/1973 | Hale | |
| 3,845,844 A | 11/1974 | Woerner | |
| 3,907,072 A | 9/1975 | Shafer | |
| 4,155,429 A | 5/1979 | Schessl | |
| 4,155,523 A | 5/1979 | Morford et al. | |
| 4,191,503 A | 3/1980 | Neff et al. | |
| 4,207,019 A | 6/1980 | Cone | |
| 4,441,586 A | 4/1984 | Bernier | |
| 4,555,211 A | 11/1985 | Metz | |
| 4,582,176 A | 4/1986 | Roberts | |
| 4,676,344 A | 6/1987 | Locicero | |
| 4,682,922 A | 7/1987 | Andre et al. | |
| 4,739,863 A | 4/1988 | Stauffer | |
| 4,781,271 A | 11/1988 | Wokeck | |
| 4,784,567 A | 11/1988 | Hageman et al. | |
| 4,804,070 A | 2/1989 | Bohler | |
| 4,833,442 A | 5/1989 | Von Heck | |
| 4,854,790 A | 8/1989 | Andre | |
| 4,934,489 A | 6/1990 | Jackson | |
| 4,955,459 A | 9/1990 | Murphy | |
| 4,963,068 A | 10/1990 | Gelder | |
| 4,969,792 A | 11/1990 | Ellis et al. | |
| 4,973,213 A | 11/1990 | Erlandsson | |
| 5,096,021 A | 3/1992 | Tart | |
| 5,173,018 A | 12/1992 | Kissel et al. | |
| 5,249,905 A | 10/1993 | Warner et al. | |
| 5,286,138 A | 2/1994 | Goodwin | |
| 5,302,063 A | 4/1994 | Winsor | |
| 5,312,213 A | 5/1994 | Winsor | |
| 5,348,437 A | 9/1994 | Krupke et al. | |
| 5,368,134 A | 11/1994 | Rickman et al. | |
| 5,375,965 A | 12/1994 | Springer et al. | |
| 5,381,680 A | 1/1995 | Rauch, Jr. | |
| 5,392,880 A | 2/1995 | Christian | |
| 5,410,897 A | 5/1995 | Edmondson | |
| 5,427,209 A | 6/1995 | Tannehill et al. | |
| 5,435,418 A | 7/1995 | Warren et al. | |
| 5,531,557 A | 7/1996 | Springer | |
| 5,547,045 A | 8/1996 | Stutzman | |
| 5,553,987 A | 9/1996 | Ellis | |
| 5,582,498 A | 12/1996 | Springer et al. | |
| 5,664,930 A | 9/1997 | Ellis | |
| 5,683,219 A | 11/1997 | Gilles, Jr. et al. | |
| 5,790,518 A | 1/1998 | Alexander et al. | |
| 5,743,697 A | 4/1998 | Alexander | |
| 5,762,459 A | 6/1998 | Springer et al. | |
| 5,803,208 A | 9/1998 | Blach | |
| 5,878,940 A * | 3/1999 | Rosenbalm | B23K 31/02 |
| | | | 228/135 |
| 5,901,816 A | 5/1999 | Camilleri | |
| 5,902,082 A | 5/1999 | Kaemper | |
| 5,934,857 A | 8/1999 | Alexander | |
| 6,082,952 A | 7/2000 | Alexander | |
| 6,092,970 A * | 7/2000 | Hahn | B65G 69/005 |
| | | | 188/32 |
| 6,123,496 A | 9/2000 | Alexander | |
| 6,238,163 B1 | 5/2001 | Springer et al. | |
| 6,290,029 B1 | 9/2001 | Gubler et al. | |
| 6,336,527 B1 | 1/2002 | Metz | |
| 6,357,987 B1 | 3/2002 | Palus | |
| 6,371,253 B1 | 4/2002 | Berends et al. | |
| 6,378,956 B1 | 4/2002 | Van De Walker | |
| 6,425,465 B1 | 7/2002 | Tallman et al. | |
| 6,439,823 B1 | 8/2002 | Lambert | |
| 6,505,713 B1 | 1/2003 | Paul et al. | |
| 6,524,053 B1 | 2/2003 | Hahn et al. | |
| 6,585,211 B1 | 7/2003 | Hageman et al. | |
| 6,589,003 B2 | 7/2003 | Berends | |
| 6,676,360 B2 | 1/2004 | Springer et al. | |
| 6,725,979 B1 | 4/2004 | Snook | |
| 6,752,381 B2 * | 6/2004 | Colak | B60T 3/00 |
| | | | 254/88 |
| 6,773,221 B2 | 8/2004 | Belongia et al. | |
| 6,835,034 B2 | 12/2004 | Winsor | |
| 6,851,523 B1 | 2/2005 | Gaster | |
| 6,863,481 B2 | 3/2005 | Pingel | |
| 6,938,734 B2 | 9/2005 | Curl | |
| 6,948,593 B2 | 9/2005 | Horton | |
| 6,978,865 B2 | 12/2005 | Fougere | |
| 7,000,740 B2 | 2/2006 | Chrisco et al. | |
| 7,032,720 B2 | 4/2006 | Jette et al. | |
| 7,036,637 B1 | 5/2006 | Wiens | |
| 7,044,698 B2 * | 5/2006 | Winsor | B60P 3/077 |
| | | | 410/30 |
| 7,128,508 B2 | 10/2006 | Anderson et al. | |
| 7,226,265 B2 | 6/2007 | Wilson | |
| 7,284,641 B1 | 10/2007 | Spence, III | |
| 7,299,902 B2 | 11/2007 | Thorpe | |
| 7,316,043 B2 | 1/2008 | Henblad et al. | |
| 7,537,095 B2 | 5/2009 | Eriksson | |
| 7,586,401 B2 | 9/2009 | Payne | |
| 7,632,052 B2 | 12/2009 | Tatina | |
| 7,958,973 B2 | 6/2011 | Swasand | |
| 7,999,680 B2 | 8/2011 | Penot | |
| 8,006,811 B2 | 8/2011 | Andersen et al. | |
| 8,047,751 B2 | 11/2011 | Powers et al. | |
| 8,104,588 B2 | 1/2012 | Curlee et al. | |
| 8,286,757 B2 | 10/2012 | Nelson | |
| 8,286,997 B2 | 10/2012 | Kimener et al. | |
| 8,307,956 B2 | 11/2012 | Andersen et al. | |
| 8,365,875 B2 | 2/2013 | Garceau | |
| 8,443,945 B2 | 5/2013 | Perkins | |
| 8,464,846 B2 | 6/2013 | Andersen et al. | |
| 8,465,245 B2 | 6/2013 | Manone et al. | |
| 8,499,897 B2 | 8/2013 | Brooks et al. | |
| 8,499,899 B2 | 8/2013 | Scott | |
| 8,528,929 B2 | 9/2013 | Kimener | |
| 8,562,264 B2 | 10/2013 | Winsor | |
| 8,590,673 B2 | 11/2013 | Andersen et al. | |
| 8,590,674 B2 | 11/2013 | Jette | |
| 8,657,078 B2 | 2/2014 | Wolfram | |
| 8,662,803 B2 | 3/2014 | Bowman et al. | |
| 8,690,501 B2 | 4/2014 | Bullock | |
| 8,779,948 B2 | 7/2014 | Faus et al. | |
| 8,783,608 B2 | 7/2014 | Affre De Saint Rome | |
| 8,807,291 B2 | 8/2014 | Saubade | |
| 8,826,963 B2 | 9/2014 | Wiegel et al. | |
| 8,831,970 B2 | 9/2014 | Weik, III et al. | |
| 8,857,574 B2 | 10/2014 | De Jong | |
| 8,869,948 B2 | 10/2014 | Saliger et al. | |
| 8,887,874 B2 | 11/2014 | Bellota | |
| 8,905,198 B2 | 12/2014 | Brooks et al. | |
| 9,079,523 B2 | 7/2015 | Morin | |
| 9,126,775 B2 | 9/2015 | Brooks et al. | |
| 9,139,384 B2 | 9/2015 | Brooks, IV et al. | |
| 9,162,831 B2 | 10/2015 | De Jong | |
| 9,212,797 B2 * | 12/2015 | Jeong | B60P 3/077 |
| 9,290,336 B2 | 3/2016 | Ballester | |
| 2001/0026751 A1 | 10/2001 | Berends | |
| 2003/0099528 A1 | 5/2003 | Hagenman et al. | |
| 2003/0159892 A1 * | 8/2003 | Jette | B60T 3/00 |
| | | | 188/32 |
| 2004/0108172 A1 | 6/2004 | Fox | |
| 2005/0047887 A1 | 3/2005 | Kenny | |
| 2005/0133315 A1 | 6/2005 | Hoofard | |
| 2005/0226705 A1 * | 10/2005 | Wilson | B60T 3/00 |
| | | | 414/401 |
| 2006/0051196 A1 | 3/2006 | McDonald | |

(56) References Cited

U.S. PATENT DOCUMENTS

| | | | |
|---|---|---|---|
| 2007/0050999 A1 | 3/2007 | Milner et al. | |
| 2008/0124203 A1 | 5/2008 | McDonald | |
| 2008/0314693 A1 | 12/2008 | Van Aspert | |
| 2009/0026022 A1* | 1/2009 | Andersen | B60T 3/00 188/32 |
| 2009/0169298 A1* | 7/2009 | Lane | E01C 9/083 404/25 |
| 2010/0170754 A1* | 7/2010 | Brooks | B60T 3/00 188/32 |
| 2010/0260586 A1* | 10/2010 | Manone | B65G 69/005 414/401 |
| 2011/0226565 A1* | 9/2011 | Jette | B60T 3/00 188/32 |
| 2011/0240416 A1* | 10/2011 | Brooks | B60T 3/00 188/32 |
| 2011/0290596 A1* | 12/2011 | Perkins | B60T 3/00 188/32 |
| 2012/0006632 A1* | 1/2012 | Nelson | B60T 3/00 188/32 |
| 2015/0027818 A1 | 1/2015 | Bellota | |
| 2016/0272168 A1 | 9/2016 | Palmer et al. | |

FOREIGN PATENT DOCUMENTS

| | | | |
|---|---|---|---|
| DE | 633272 | A | 7/1936 |
| EP | 0128992 | A1 | 12/1984 |
| EP | 0384850 | B1 | 11/1994 |
| EP | 0537075 | B1 | 4/1995 |
| EP | 0496727 | B1 | 9/1996 |
| EP | 0836579 | B1 | 2/1999 |
| EP | 1095880 | A1 | 5/2001 |
| EP | 1167253 | B1 | 4/2004 |
| EP | 2236445 | B1 | 4/2011 |
| EP | 2292481 | B1 | 5/2013 |
| EP | 2089302 | B1 | 11/2013 |
| EP | 2380833 | B1 | 9/2014 |
| EP | 2796395 | A1 | 10/2014 |
| EP | 2307237 | B1 | 1/2016 |
| EP | 2832669 | B1 | 4/2016 |
| FR | 2652340 | B1 | 1/1992 |
| FR | 2873351 | A1 | 1/2006 |
| FR | 2869578 | B1 | 6/2006 |
| GB | 774550 | A | 5/1957 |
| GB | 779681 | A | 7/1957 |
| GB | 2290590 | B | 4/1998 |
| GB | 2410482 | B | 1/2007 |
| WO | 9749625 | A1 | 12/1997 |
| WO | 2008098742 | A1 | 8/2008 |
| WO | 2010029181 | A1 | 3/2010 |
| WO | 2016191882 | A1 | 12/2016 |

OTHER PUBLICATIONS

Machine translation in English of EP0384850.
Machine translation in English of EP0496727.
Machine translation in English of EP0537075.
Machine translation in English of EP0836579.
Machine translation in English of EP2089302.
Machine translation in English of EP2236445.
Machine translation in English of EP2292481.
Machine translation in English of EP2307237.
Machine translation in English of EP2380833.
Machine translation in English of EP2832669.
Machine translation in English of FR2652340.
Machine translation in English of FR2869578.
Machine translation in English of FR2873351.
Machine translation in English of WO9749625.
Machine translation in English of WO200898742.
Machine translation in English of WO201029181.
International Preliminary Report on Patentability (Chapter I) of PCT/CA2016/050634 issued by The International Bureau of WIPO dated Dec. 5, 2017.

* cited by examiner

BIDIRECTIONAL WHEEL CHOCK RESTRAINT SYSTEM

CROSS REFERENCE TO PRIOR APPLICATIONS

The present case is a continuation of PCT Application No. PCT/CA2016/050634 filed on 3 Jun. 2016. PCT/CA2016/050634 claims the benefits of U.S. patent application No. 62/170,565 filed 3 Jun. 2015. The entire contents of these two prior patent applications are hereby incorporated by reference.

TECHNICAL FIELD

The technical field relates generally to bidirectional wheel chock restraint systems for preventing vehicles from moving away in an unauthorized or accidental manner when they are parked, for instance at a loading area, at a loading pad, in a parking lot, or in any other suitable kind of driveways or locations.

BACKGROUND

A wheel chock is a device that can be positioned immediately in front of a wheel of a parked vehicle to act as an obstacle and prevent the vehicle from moving. Small conventional wheel chocks, such as ones made of rubber or metal, are simply set down on the ground surface and are known to be inefficient when strong forces are involved. This can happen as a result, for instance, of an unauthorized or accidental premature departure caused by an error or a miscommunication, or because someone is trying to steal the vehicle. Other situations exist.

While existing wheel restraint systems that are anchored or otherwise attached to the ground have proven to be efficient over the years for use in loading docks, they are essentially designed to prevent vehicles from departing in only one direction.

Various approaches have been suggested in the past to prevent a vehicle from moving away, both in forward and rearward directions, in more open areas. Some approaches involve arrangements having side railings or other similar structures located on one or even on both sides of a driveway so as to support a blocking element. Hence, they generally require a relatively high capital cost investment for their acquisition and their installation. They also often create undesirable complications since they tend to be invasive and cumbersome, adding permanent obstacles around the vehicles. Removing snow or ice around these structures is often very difficult when they are installed in regions subjected to cold weather conditions. Moreover, these structures and/or the associated blocking elements are likely to be permanently damaged each time a vehicle is actively prevented from moving, particularly a large vehicle such as a truck, due to their designs and the strong forces that can be involved during such event when the vehicle engages a blocking element.

Therefore, there is still room for further improvements in this area of technology.

SUMMARY

The proposed concept involves a new approach in the design of restraint systems for wheeled vehicles. It provides a wide range of new wheel chocking solutions based on various possible implementations of a bidirectional wheel chock restraint system. It also provides new wheeled vehicle restraining methods. They involve using a ground-anchored base plate and, depending on the situation, a single double-sided wheel chock, for instance placed between two tandem wheels, or two single-sided wheel chocks placed on opposite sides of a same wheel or in opposite directions on a wheel set. Among other things, the new approach is simple to use, provides strong restraining capabilities, does not require side railings or other cumbersome structures, and does not involve a complicated design with many movable parts that may also be prone to wear or failure.

In one aspect, there is provided a bidirectional wheel chock restraint system for a vehicle, the restraint system including: an elongated base plate extending along a longitudinal axis, the base plate having a plurality of stoppers transversally-disposed over the base plate and that are spaced apart from one another along the longitudinal axis; and a single double-sided wheel chock that is configured and disposed to cooperate with the base plate, the wheel chock including at least one substantially downwardly-projecting forward-blocking tooth and at least one substantially downwardly-projecting rearward-blocking tooth, the forward-blocking tooth and the rearward-blocking tooth being longitudinally spaced apart from one another, the wheel chock being longitudinally slidable on the base plate between a forward wheel-blocking position and a rearward wheel-blocking position, the wheel chock being in the forward wheel-blocking position when the forward-blocking wheel chock tooth is in a latching engagement with a rear lateral surface, provided on a corresponding one of the base plate stoppers, and the wheel chock being in the rearward wheel-blocking position when the rearward-blocking wheel chock tooth is in a latching engagement with a front lateral surface provided on a corresponding one of the base plate stoppers.

In another aspect, there is provided a bidirectional wheel chock restraint system for preventing a parked vehicle from moving both in a forward direction and a rearward direction, the restraint system including: an elongated base plate extending along a longitudinal axis, the base plate having a plurality of stoppers transversally-disposed over the base plate and that are spaced apart from one another along the longitudinal axis; and a front wheel chock and a rear wheel chock, each having a wheel-facing side and at least one substantially downwardly-projecting tooth, the front wheel chock and the rear wheel chock being in a wheel-blocking position when placed, respectively, immediately in front and immediately behind a same one of the wheels of the parked vehicle while this vehicle wheel rests over the base plate, or when placed, respectively, immediately in front of a first one of the wheels of a wheel set and immediately behind a second one of the wheels of the wheel set while at least one of these two vehicle wheels rests over the base plate, the two wheel chocks being opposite to one another and each wheel chock having the wheel chock tooth that can engage a lateral surface of corresponding ones of the base plate stoppers in a latching engagement.

In another aspect, there is provided a bidirectional wheel chock restraint system as shown and/or described and/or suggested herein.

In another aspect, there is provided a method of restraining a wheeled vehicle from moving in both a forward and a rearward direction, as shown and/or described and/or suggested herein.

More details on the numerous aspects, features and advantages of the proposed concept can be found in the following detailed description and the appended figures.

DETAILED DESCRIPTION

Figure 1:
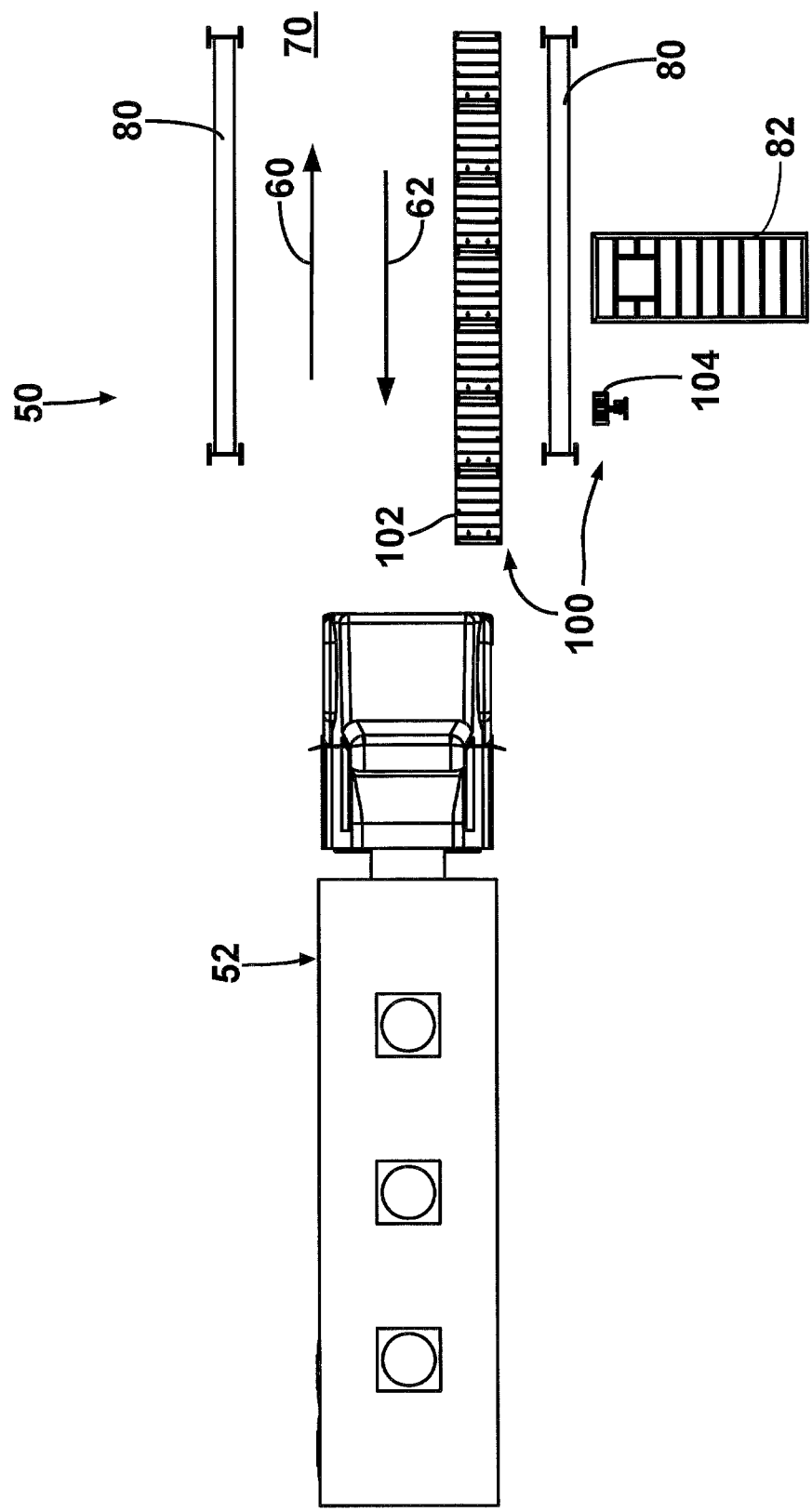
FIG. 1 is a top view of an example of a driveway for a wheeled vehicle in which is provided an example of a bidirectional wheel chock restraint system in accordance with the proposed concept.

FIG. 1 is a top view of an example of a driveway 50 for a wheeled vehicle 52 in which is provided an example of a bidirectional wheel chock restraint system 100 in accordance with the proposed concept. The illustrated vehicle 52 is a truck, more particularly a truck tractor and its trailer that includes a tank for transporting liquids, such as fuel or others. The illustrated driveway 50 is a loading area, more particularly a filling station for loading fuel into the tank of the vehicle 52. It should be understood that the illustrated driveway 50 and the illustrated vehicle 52 are only generic examples provided for the sake of illustration.

The vehicle 52 in FIG. 1 is shown as it arrives on site and advances to where it will be parked while fuel will be loaded in its tank. This situation only represents one possible context where it can be useful or required to prevent a wheeled vehicle 52 from moving in both travel directions during a certain time period. Many others situations exist. Likewise, trucks are not the only vehicles with which the proposed concept can be used. The vehicles can even be airplanes on the ground, or a railroad vehicle, to name just a few.

It should be noted that the term "driveway" is used herein in a generic sense and applies to many various situations. This includes locations where freight or other kinds of payload are loaded or unloaded in vehicles. A driveway is often located on a relatively flat horizontal surface but some can be located on a slopped surface or have a portion that is on a slopped surface. It is not necessarily a paved road. The term "driveway" is also intended to include locations where a wheeled vehicle undergoes an inspection or a maintenance operation, either indoors or outdoors. The term "ground" refers generally to the surface of the driveway. The expression "maintenance operation" includes a very wide variety of actions, such as making repairs, but it can also include actions such as cleaning, painting or even deicing a vehicle. For instance, airplanes undergoing a deicing operation immediately prior to take-off are wheeled vehicles for which using the proposed concept can be very useful. Airplanes must remain stationary until the deicing procedure is entirely completed and the pilots are told they are cleared to resume moving towards the runway. Moving the airplane prematurely will compromise safety, particularly for the workers spraying the de-icing fluids on the airplanes. Still, airport aprons can also be considered to be driveways and airplanes parked in airport aprons can benefit from using the proposed concept.

Figure 2:
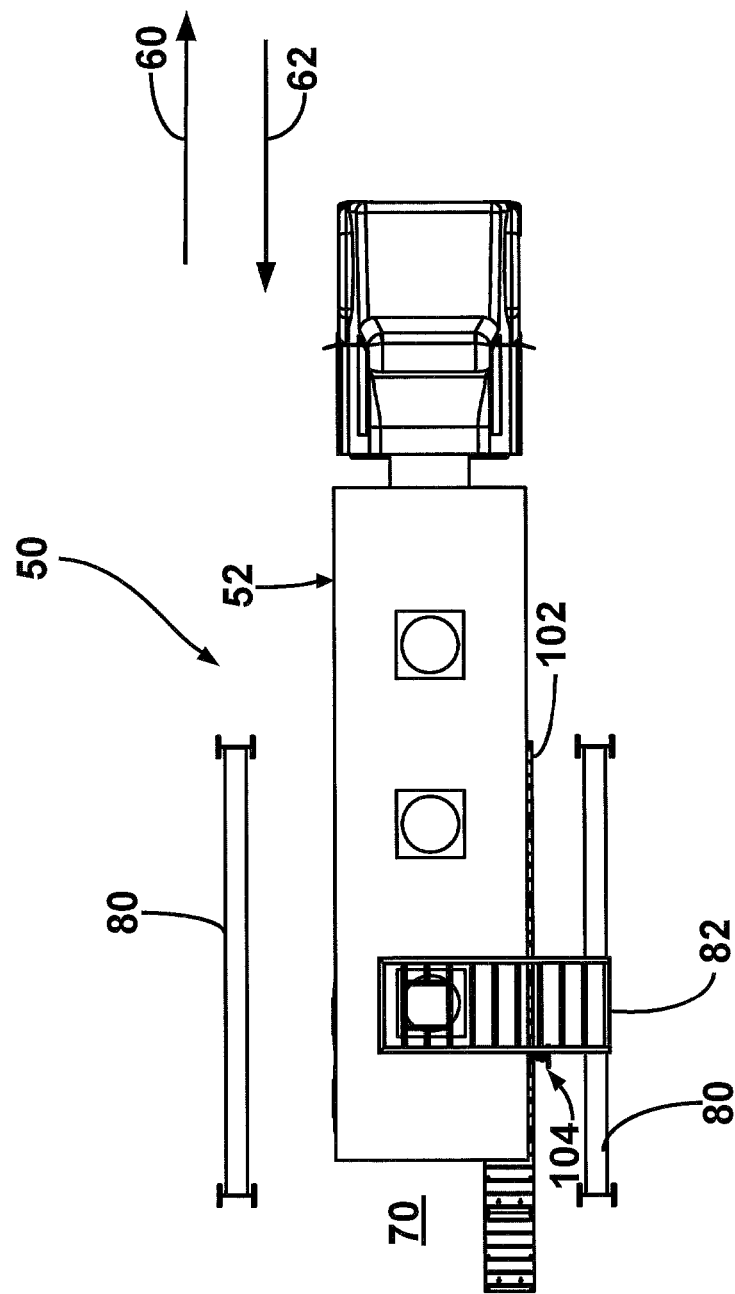
FIG. 2 is a view similar to FIG. 1, illustrating the vehicle being parked and ready for loading.
Figure 3:
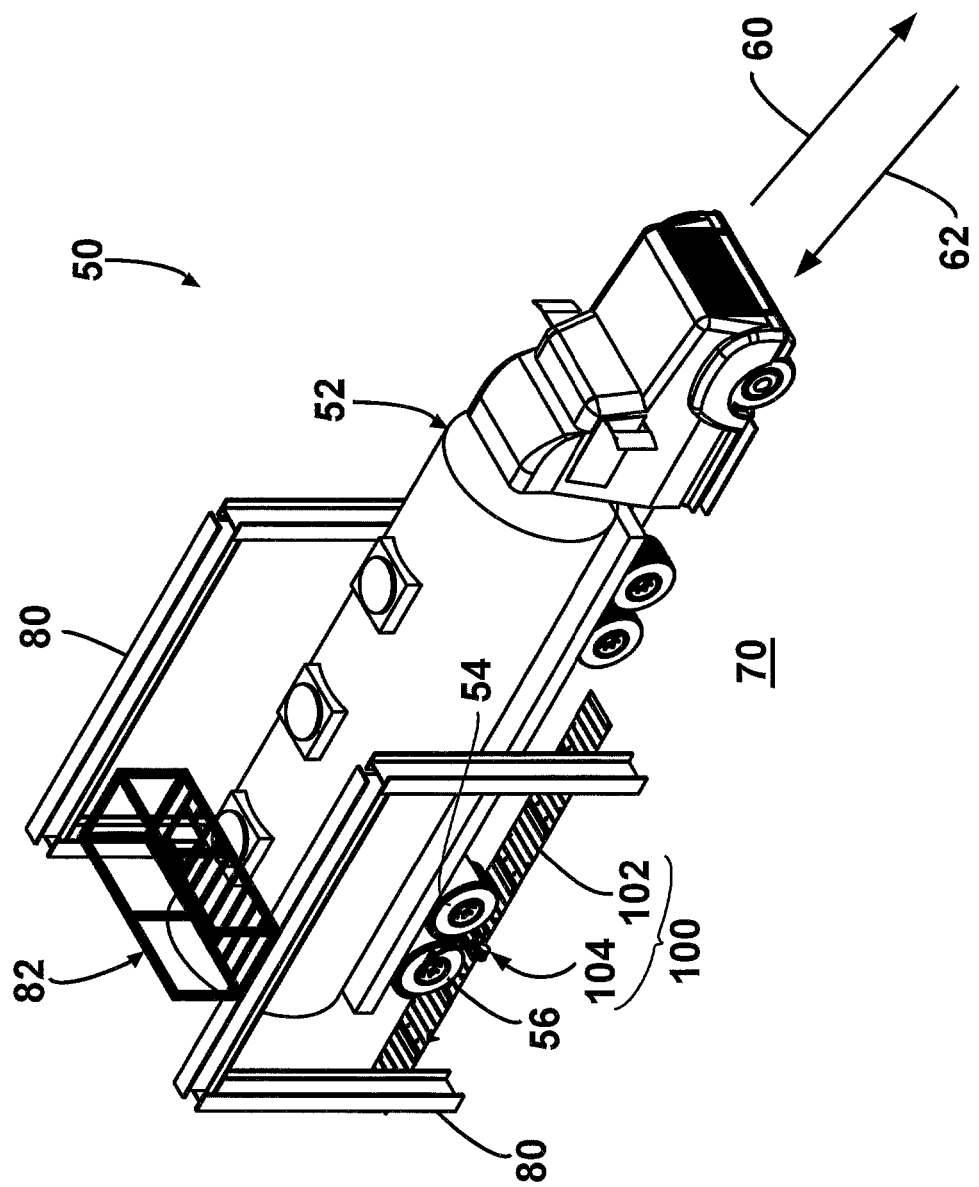
FIG. 3 is an isometric view of what is shown in FIG. 2.

Unlike restraint systems designed for use at truck loading docks where a truck can only depart in a forward direction, the vehicle 52 in the driveway 50 must be prevented from departing, for safety reasons, in both the forward and rearward travel directions. In FIGS. 1 to 3, the forward travel direction is depicted with arrow 60 and the rearward direction is depicted with arrow 62. The vehicle 52 can move away in the forward and/or rearward travel directions 60, 62 under its own motor power as a result of an error or a miscommunication. In other situations, vehicles can potentially move away without using their own motor power.

Examples of situations include strong winds pushing a vehicle or simply gravity acting on a vehicle parked in a hill, to name just a few.

FIG. 2 is a view similar to FIG. 1, illustrating the vehicle 52 once parked and ready for loading or unloading. FIG. 3 is an isometric view of what is shown in FIG. 2. The vehicle 52 is said to be "parked". The term "parked" means that the vehicle 52 must remain stationary even if this is only for a very short time. In a vehicle equipped with a transmission, the driver would usually select the parked position of the transmission or at least the neutral position during that time period, as opposed for instance to simply keeping the brake pedal depressed and otherwise be ready for an imminent departure. Exceptions exist.

In many situations, including the one shown in the example of FIGS. 1 to 3, it is imperative that the vehicle 52 remains stationary for loading or unloading. The vehicle 52 must not be able to depart, for instance even if the driver thinks the loading/unloading process is completed and then prematurely starts to drive away without knowing that such process is not over yet. Some loading areas may require that the driver leaves the cabin and proceed himself or herself with various tasks around the vehicle 52, including sometimes getting on top of the vehicle 52 to open a hatch and install the loading pipe for instance. The driver seat remains unattended during that time and no one can quickly intervene if the vehicle 52 starts to move by itself for some reasons.

The restraint system 100 is a safety device that is usually installed on the ground and that is designed for preventing the vehicle 52 from moving in both travel directions for a given time period while some procedures are carried out. It is designed to be very simple, easy to use and yet very efficient. It also does not require using side railings or other cumbersome structures that can complicate or restrict movements around the vehicle 52.

The restraint system 100 includes an elongated base plate 102. The base plate 102 is rigidly anchored to a ground surface 70, for instance using fasteners such as bolts or using any other suitable arrangement. In most implementations, the base plate 102 is installed over the ground surface or is partially embedded into the ground surface 70, for instance in a shallow recess. In the illustrated example, the base plate 102 is located where at least one of the vehicle wheels will be positioned directly on the base plate 102 when the vehicle 52 is parked. Also, as can be seen, the base plate 102 extends along a longitudinal axis that is parallel to the travel directions 60, 62 in the illustrated example. It should be noted that the longitudinal axis could also be tangential to the travel directions 60, 62 in some implementations.

FIGS. 2 and 3 illustrate the vehicle 52 once parked and with a single double-sided wheel chock 104 being in position in the intervening space between two longitudinally juxtaposed wheels 54, 56. This wheel chock 104 is part of the restraint system 100. The wheel chock 104 can also be seen in FIG. 1, where it is positioned on the side of the driveway 50 pending the arrival of the vehicle 52. Once in position on the base plate 102, the wheel chock 104 creates a wheel-blocking obstacle and will only be removed when it is safe to do so, for instance when the operations are entirely completed and the vehicle 52 is formally authorized to depart by everyone involved. The wheel chock 104 is otherwise left in position onto the base plate 102.

As can be seen, the illustrated base plate 102 is much longer than required and such extended length provides more possible positions for the wheel chock 104. For instance, vehicles of different lengths and configurations can go through the driveway 50. Having these numerous possible positions for the wheel chock 104 can be very useful to maximize the versatility of the restraint system 100. Furthermore, even the exact parking location of a same vehicle can vary, depending for instance on which compartment of the tank will be filled at the filling station in the driveway 50 of the illustrated example.

The two longitudinally juxtaposed wheels 54, 56 of the vehicle 52 are mounted on two corresponding tandem axles. The wheel 54 is located immediately in front of the wheel 56. For the sake of simplicity, these two wheels 54, 56 will now simply be referred to as the "tandem wheels", more particularly as the front tandem wheel 54 and the rear tandem wheel 56, respectively. The tandem wheels 54, 56 are each mounted on a respective axle and are on a same side (right or left) of the vehicle 52. In the example illustrated in FIGS. 1 to 3, the tandem wheels 54, 56 are located at the rear of the vehicle's trailer and on its right side. The tandem wheels 54, 56 can also be the corresponding ones located on the left side of the vehicle 52. For instance, if the vehicle 52 can enter the illustrated driveway 50 from the opposite direction, the base plate 102 and the wheel chock 104 would be on its left side. References to the right and left sides correspond to the right and left sides of the vehicle 52. Also, if the vehicle 52 enters the driveway 50 from the opposite direction than that shown in FIGS. 1 to 3, the forward and rearward travel directions 60, 62 would then be inverted. References to the forward and rearward travel directions correspond to the forward and rearward travel directions of the vehicle 52.

The tandem wheels between which a single double-sided wheel chock 104 is placed are not always necessarily at the rear of a given vehicle. It is however generally desirable that the wheel chock 104 be placed next to tandem wheels that are not on driving axles. For instance, the tandem wheels on a truck tractor like the one of the illustrated example are mounted on driving axles and are thus driving wheels. Wheel chocks work more efficiently with non-driving wheels since driving wheels are more likely to generate an uplifting force and roll over a wheel chock. Nevertheless, one could use the wheel chock 104 even when one or even both of the tandem wheels are driving wheels if such use is found to be appropriate for the intended purpose.

It should be noted that in the context, wheels of a given vehicle are considered to be "tandem" wheels even if they are part of a wheeled arrangement involving a group of three or more juxtaposed axles, which group may sometimes be referred to using other expressions in some technical fields.

The wheel chock 104 in the example shown in FIGS. 1 to 3 is double sided and only one is required to block the vehicle 52 in both directions. Having a double-sided wheel chock 104 only on one side of the vehicle 52 is generally enough to restrain the vehicle 52 as intended. A single wheel chock 104 is simpler to manage and can save time. Nevertheless, if desired, one can use two laterally spaced-apart base plates on a same driveway and use two wheel chocks simultaneously, for instance on the right and left sides of a vehicle, or use a single wheel chock but always on a same vehicle side (right or left), regardless from where the vehicle enters. Still, one could use two or more double-sided wheel chocks simultaneously at different locations on a same vehicle side.

Using a single double-sided wheel chock 104 is not the only possible implementation since the restraint system 100 can also include two opposite wheel chocks, each being provided on a respective side of a same wheel of the vehicle 52 or in opposite directions on the wheels in a wheel set.

This other version of the restraint system 100 is described hereafter and can be useful if no tandem wheels are present on a given vehicle or for other reasons, such as when the vehicle's frame configuration creates physical obstacles preventing access to the intervening space between the tandem wheels, or when the intervening space between a pair of tandem wheels is not located right above the base plate 102 for some reasons. Still, one can use the two opposite wheel chocks even if using a single double-sided wheel chock 104 is possible, and one can also use a single double-sided wheel chock 104 on a vehicle that does not have tandem wheels. For instance, there are implementations where someone could want to block a vehicle in both directions. More details on this implementation will be given later.

In the illustrated example, the driveway 50 is depicted with framework structures 80, one on each side thereof. These framework structures 80 are unrelated to the proposed concept and are only depicted in a semi-schematic manner for the sake of explanations. One of these framework structures 80 supports a retractable overhead catwalk 82 to help someone gaining access to the top of the vehicle's trailer. The framework structures 80 can also support various kinds of equipment, such as pipes and cables to name just a few, depending on what is necessary to achieve at that location. Many other variants and configurations are possible as well, including ones where no framework structures are present. In general, it is desirable that a vehicle restraint system does not rely on framework structures provided for other purposes to actively supporting one of its components, particularly if the maximum forces applied to a component could potentially create a structural failure of these other framework structures. The illustrated restraint system 100 has its base plate 102 anchored to the ground.

Figure 4:
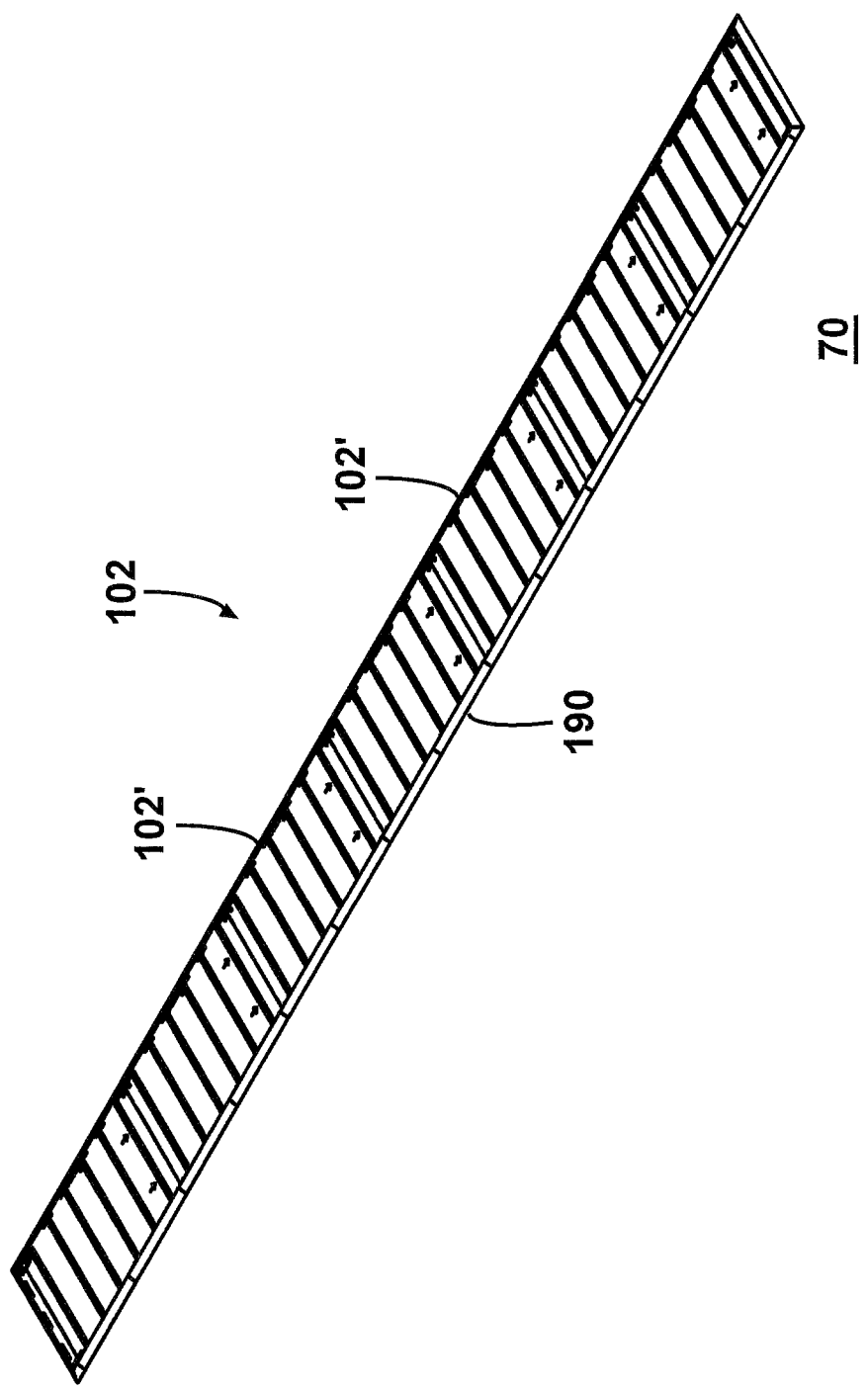
FIG. 4 is an isometric view illustrating only the base plate of the restraint system in FIGS. 1 to 3.

FIG. 4 is an isometric view illustrating only the base plate 102 of the restraint system 100 in FIGS. 1 to 3. As can be seen, the illustrated base plate 102 includes a plurality of sections 102' placed end-to-end so as to form a continuous element. This base plate 102 also has identical sections 102'. Nevertheless, one can design the base plate 102 with one or more of the sections being different from others.

Compared to a base plate consisting of a single monolithic full-length section, assembling a base plate 102 made of a plurality of relatively short sections 102' generally decreases manufacturing costs, as well as costs related to storage, transportation and handling. It is also more convenient to have the possibility of customizing the length of the base plate 102 by changing the number of sections 102'. Nevertheless, manufacturing the base plate 102 as a single monolithic element still remains a possible option. One can also provide a base plate 102 where the adjacent ends between two or more of its sections 102' are spaced apart from one another. They can still be considered as being part of the same base plate.

If desired, the base plate 102 can be provided with a heating element therein that is capable of melting ice and snow in cold weather conditions.

Figure 5:
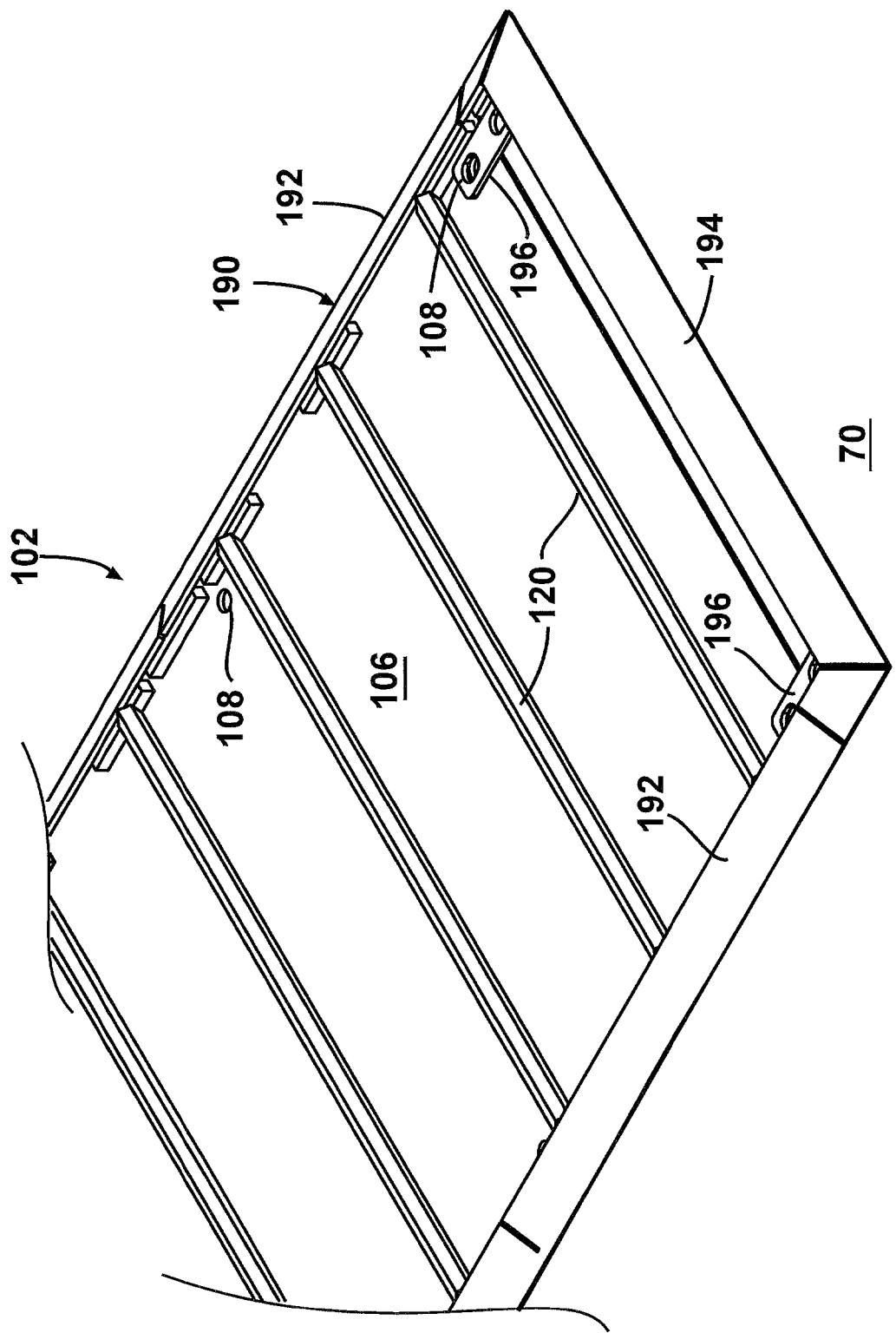
FIG. 5 is an enlarged isometric view of one of the ends of the base plate of FIG. 4.

FIG. 5 is an enlarged isometric view of one of the ends of the base plate 102 of FIG. 4. Each base plate section 102' includes for instance a rectangular sheet plate 106 made of a metal such as steel or an alloy thereof. The plate 106 has a plurality of spaced-apart holes 108 around its periphery for receiving the fasteners. Variants are possible as well. For instance, the shape and/or the material and/or the anchoring arrangement can be different in some implementations.

The illustrated base plate 102 is surrounded by a peripheral slanted rim 190 to smooth the edges of the base plate 102. The peripheral rim 190 includes longitudinal rim portions 192 on each section 102' and two transversal rim portions 194, namely one of each section 102' that are located at the opposite ends of the base plate 102. The longitudinal rim portions 192 can be welded or otherwise attached on each base plate sections 102' during manufacturing and/or during installation. The transversal rim portions 194 can be removably attached on each end section 102' using a pair of brackets 196 and the fasteners provided to anchor the base plate 102 into the ground surface 70, if fasteners are used for anchoring. Variants are possible as well. The peripheral slanted rim 190 can be omitted in some implementations.

The base plate 102 also includes a plurality of blocking elements, hereafter referred to as the stoppers 120, which are transversally-disposed over the base plate 102 in the illustrated example. These stoppers 120 are spaced apart from one another along the longitudinal axis and generally project above the top surface of the plate 106. Each stopper 120 provides at least one lateral surface against which a corresponding part of the wheel chock 104 can abut so as to create a wheel-blocking engagement. Variants and other configurations are possible as well.

The stoppers 120 in the illustrated example can be made of a metallic material, such as steel or an alloy thereof. Variants are possible. In the illustrated example, the stoppers 120 were rigidly attached to the plate 106 by welding. These stoppers 120 were also machined, prior to welding, in order to obtain their final shape as shown. The illustrated stoppers 120 were welded from the underside of the plate 106. This approach involves manufacturing the plate 106 with one transversal slot 124 for each stopper 120. Nevertheless, this method is optional and welding is not the only possible way of attaching the stoppers 120 to the plate 106. Other manufacturing methods and processes are possible.

Figure 6:
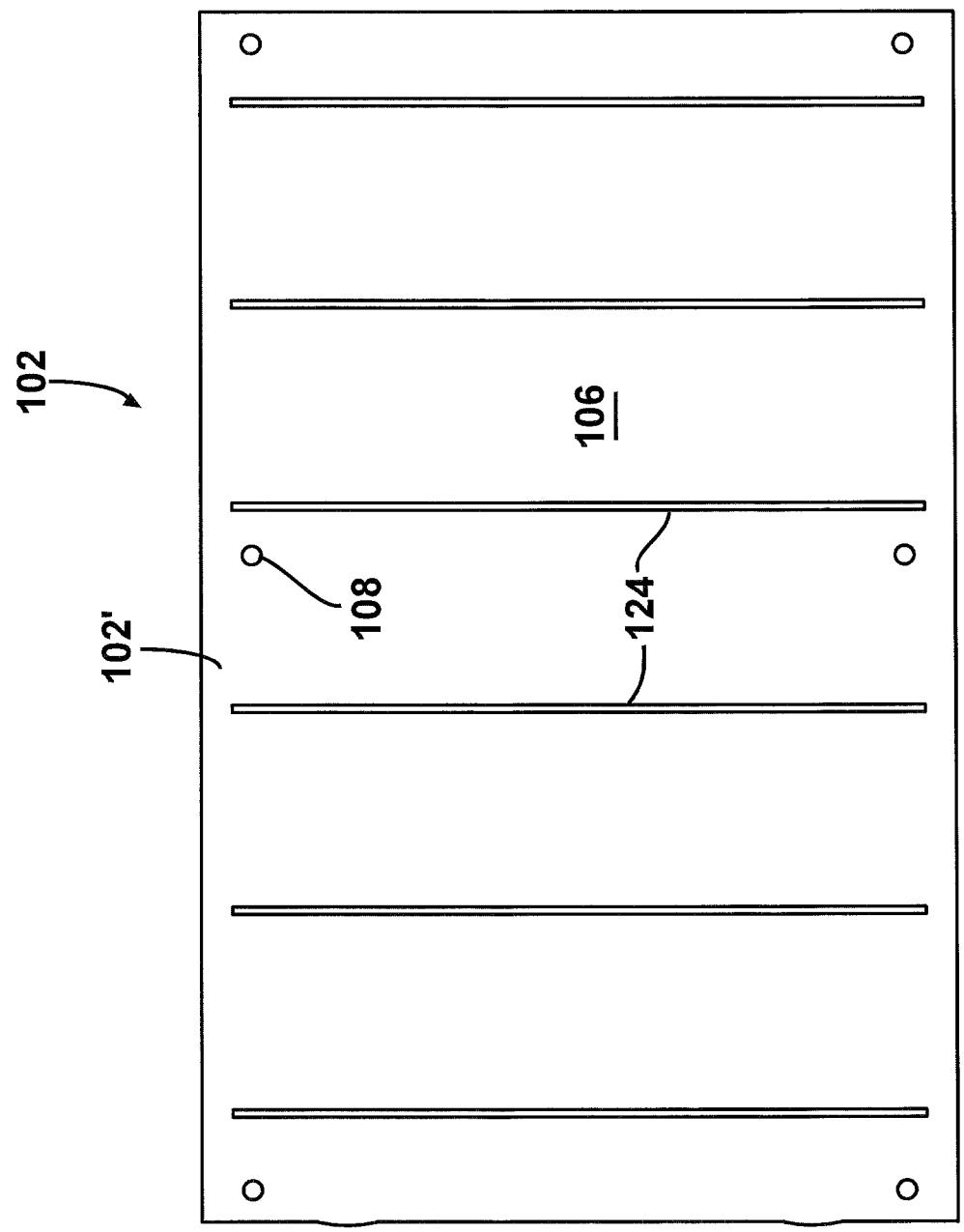
FIG. 6 is a bottom view illustrating the underside of one of the base plate sections of FIG. 4.

FIG. 6 is a bottom view illustrating the underside of one of the base plate sections 102' of FIG. 4. In the base plate 102 of FIGS. 4 and 5, the bottom edge of each stopper 120 was inserted into the corresponding transversal slots 124 so as to abut against the top peripheral rim of its corresponding transversal slot 124. Each stopper 120 was then welded from the underside, leaving the junctions between the stoppers 120 and the top surface of the plate 106 substantially free of welding cords.

Figure 7:
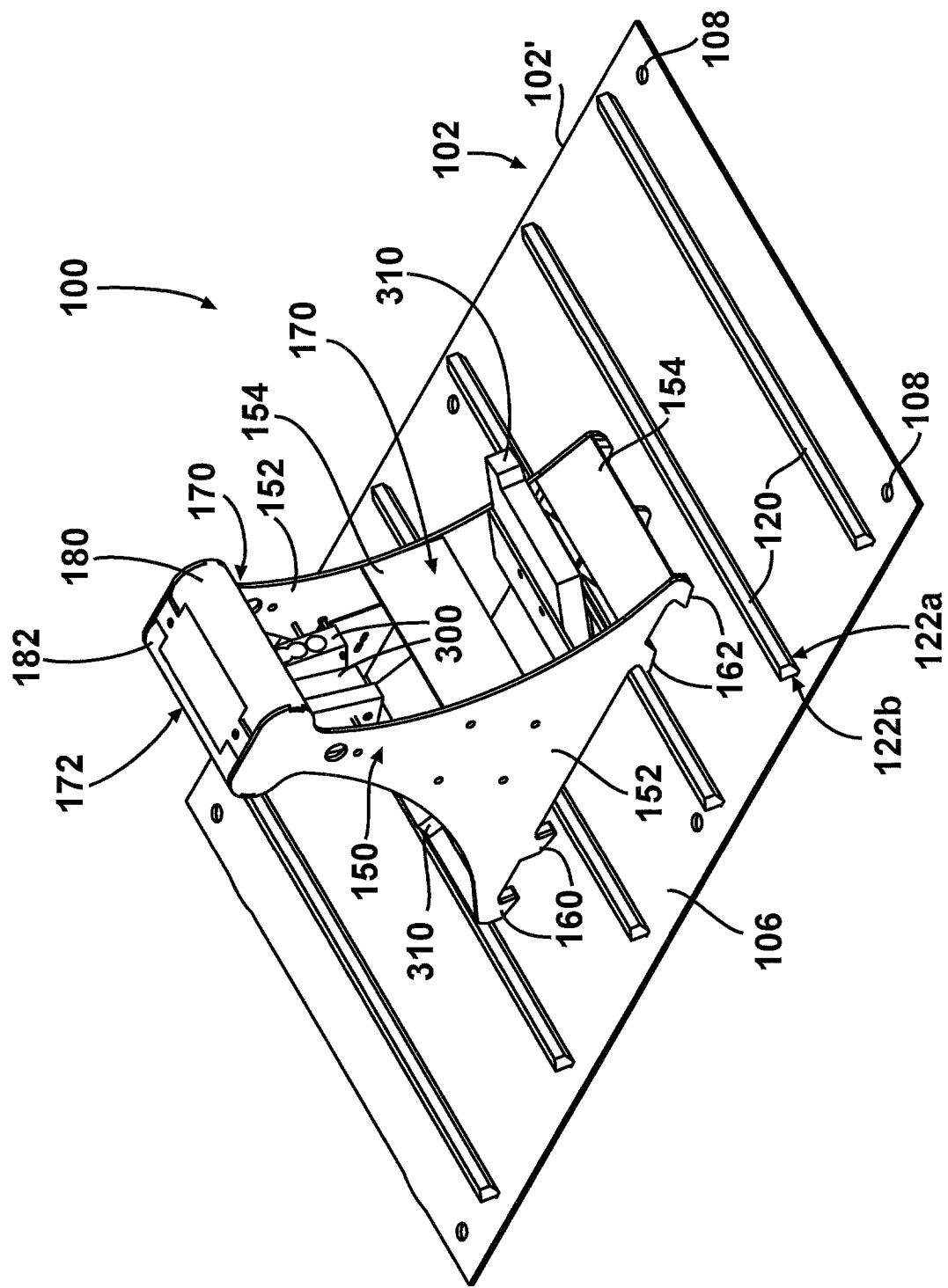
FIG. 7 is an enlarged isometric view of the restraint system of FIGS. 1 to 3.

FIG. 7 is an enlarged isometric view of the restraint system 100 of FIGS. 1 to 3. For the sake of simplicity, FIG. 7 only shows one section 102' of the base plate 102. As can be seen, the wheel chock 104 includes a main body 150. The main body 150 is the supporting structure of the wheel chock 104. It is designed for resisting the forces applied on the wheel chock 104 by either ones of the tandem wheels 54, 56 of the vehicle 52 in the case of a departure attempt. The main body 150 of the illustrated wheel chock 104 has a monolithic construction and its parts are made of a strong rigid material, for instance steel or an alloy thereof. It should be noted that in the present context, the expression "monolithic construction" means that there are no moving or easily detachable parts once the structure of the main body 150 is fully assembled. Hence, the main body 150 does not have a foldable construction when it has a monolithic construction.

Additional components can be added to the main body 150, if desired and/or required, but a monolithic main body does not require any movable parts to cooperate with the base plate 102. Advantages of having a monolithic construction include maximizing the simplicity of use, improving strength due to the absence of hinges or the like, particularly where the highest stresses can occur in use, and minimizing the manufacturing costs. Nevertheless, variants are possible as well. For instance, other materials can be used and the main body 150 could have a construction that is not monolithic in some implementations.

In the illustrated example, the main body 150 of the wheel chock 104 includes two spaced-apart main side members 152. The side members 152 can be in the form of substantially vertically-extending plates but variants are also possible. They can be rigidly connected together using transversal members, for instance a plurality of transversal members 154 that are welded or otherwise rigidly attached to the side members 152. Variants are possible as well.

The double-sided wheel chock 104 includes a front wheel-facing side 170 and a rear wheel-facing side 172 that is opposite to the front wheel-facing side 170. The front wheel-facing side 170 is the side that is adjacent to the front tandem wheel 54 when the illustrated wheel chock 104 is in position. The rear wheel-facing side 172 is the side that is adjacent to the rear tandem wheel 56 when the illustrated wheel chock 104 is in position. The double-sided wheel chock 104 preferably has a symmetrical construction, for instance with reference to a vertical transversal plane at the center, so it can be placed on the base plate 102 either ways. This feature can greatly simplify handling but nevertheless, one can design a wheel chock that is not symmetrical. Such wheel chock could then have, for instance, a forward and a rearward orientation.

Unlike in conventional wheel restraint systems, the two wheel-facing sides 170, 172 of the illustrated wheel chock 104 are greatly recessed so as to provide corresponding tire deformation cavities located immediately below front and rear wheel-engaging bulges 180, 182 when the vehicles are provided with tires. Each side can be constructed, for instance, as disclosed in PCT patent application No. PCT/CA2014/051143 filed on 28 Nov. 2014 and published on 4 Jun. 2015 under publication No. WO 2015/077893 A1. The content of PCT/CA2014/051143 is hereby incorporated by reference in its entirety. Variants are possible as well.

The wheel-engaging bulges 180, 182 of the illustrated example are located at a top end of the wheel chock 104. They provide the main engagement points on which a corresponding one of the tandem wheels 54, 56 will exert most of its pressing force against the wheel chock 104 in the event of a premature or otherwise unexpected departure. The wheel-engaging bulges 180, 182 have a non-puncturing shape to prevent the tandem wheels 54, 56 to be punctured or be otherwise damaged. They can include a smooth and continuous rounded convex surface extending transversally, as shown. Variants are also possible. For instance, the wheel-engaging bulges 180, 182 can be more or less triangular in profile, with a rounded tip. Many other shapes are possible. When viewed from the side, the wheel-engaging bulges 180, 182 have a profile including a top surface portion and a bottom surface portion. The approximate medial line at the boundary between these top and bottom surface portions will engage the tire tread at the initial stage. They can be referred to as a bulge engagement points.

The tire deformation cavities define corresponding recessed wheel-facing surfaces that are each spaced apart from the tire tread of the corresponding tandem wheels 54, 56 when one of these tandem wheels 54, 56 initially contacts the corresponding one of the wheel-engaging bulges 180, 182 in an undeformed state. In the illustrated example, each recessed wheel-facing surface is provided by the parallel edges of the side members 152. The intervening spaces between the interior faces of the side members 152 can be left open, for instance to save weight, but the edges must then have a minimum width. The edges could otherwise act as blades and damage the tire treads to prevent them from acting as blade edges that can puncture or otherwise rupture the tire treads under an intense pressing force. If required, a ledge or a similar feature can be added to locally increase the width of each edge. Variants are possible as well.

The main purpose of the tire deformation cavities is to capture as much volume as possible of the tire treads on the bottom surface portion of the wheel-engaging bulges 180, 182 when one of them is subjected to a deformation created by a horizontal force. This horizontal force can be the result, for instance, of the vehicle 52 applying a strong force in the forward and/or rearward travel directions 60, 62. The horizontal force is applied at the rotation axis of the tandem wheel 54, 56 that engages the wheel chock 104 at that moment.

A resilient spacer 310 is provided on both sides of the wheel chock 104. These spacers 310 can be made of rubber or of another suitable material. They keep the wheel chock 104 slightly away from the tandem wheels 54, 56 so as to mitigate the risks of having the wheel chock 104 becoming stuck under one of the tandem wheels 54, 56 due to the weight the vehicle 52 increasing as the vehicle 52 is loaded. Variants are possible. One or the two spacers can be omitted as well.

Also shown in FIG. 7 are sensors 300 installed inside the main body 150 of the wheel chock 104 to detect the presence of the tandem wheels 54, 56 next to the wheel chock 104 during operation. Since the illustrated wheel chock 104 is a double-sided wheel chock, two sensors 300 are provided, one towards each side. The sensors 300 could be of many different types, such as non-contact sensors (photocell) or the like. Using mechanical arrangements are possible as well.

The driveway 50 can include different other security and safety systems. They can use signals from the sensors 300 to trigger different functions and/or prevent other systems from operating unless the wheel chock 104 is properly placed between the tandem wheels 54, 56. Triggered functions can include, for instance, issuing audible and/or visual alarm signals if the sensors 300 do not indicate a proper positioning of the wheel chock 104 and someone attempts to initiate a task that must only be done if the wheel chock 104 is properly positioned. Signals from the sensors 300 can also be sent to other active security or safety systems, such as interlocks, locking systems, barriers, etc. They may require the use of identification (ID) cards and/or rely on biometric sensors, such as retina, fingerprints or others. Many other variants are possible as well.

Figure 8:
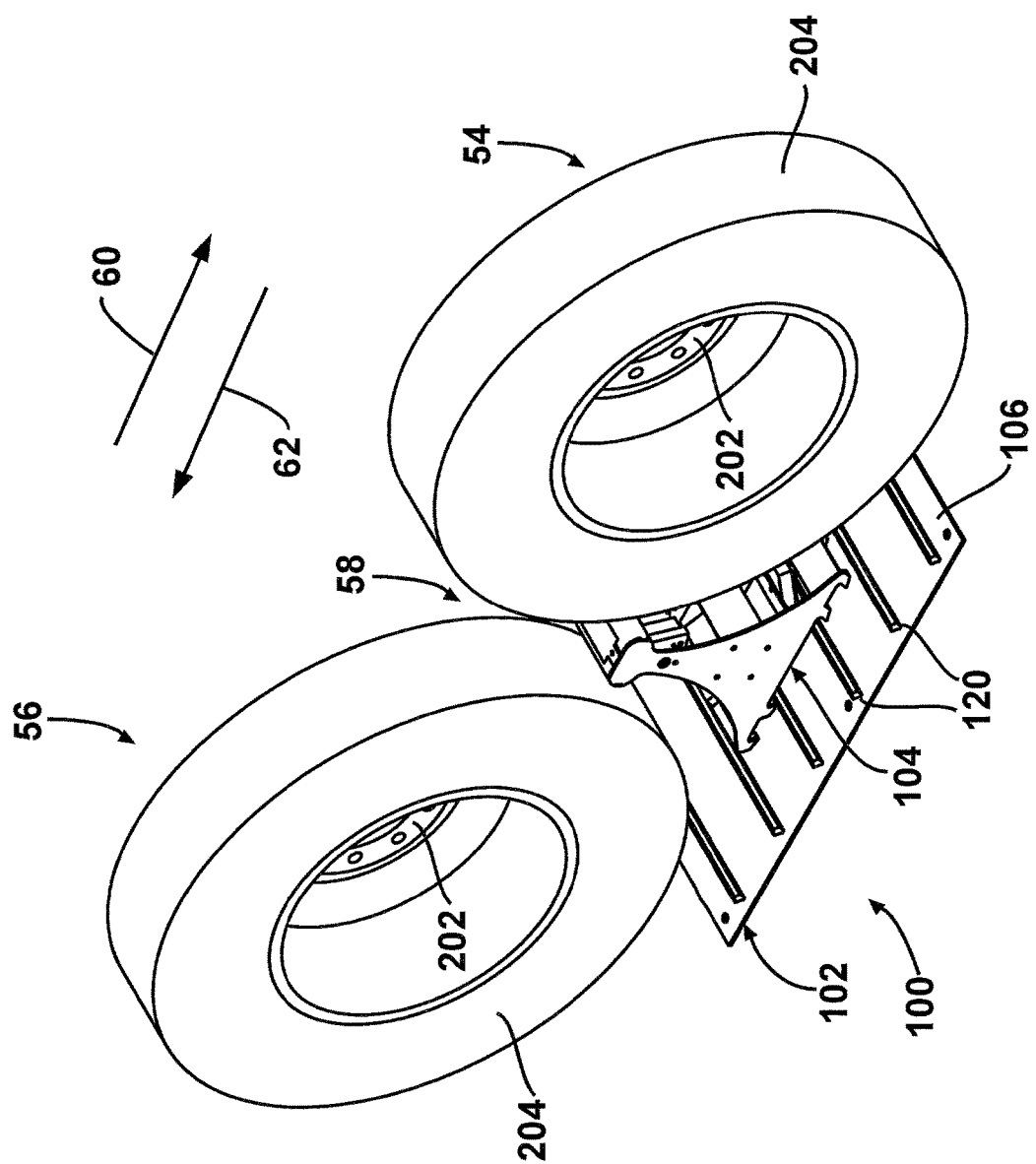
FIG. 8 is a view similar to FIG. 7 but where the tandem wheels of the generic vehicle of FIGS. 1 to 3 are also shown.
Figure 9:
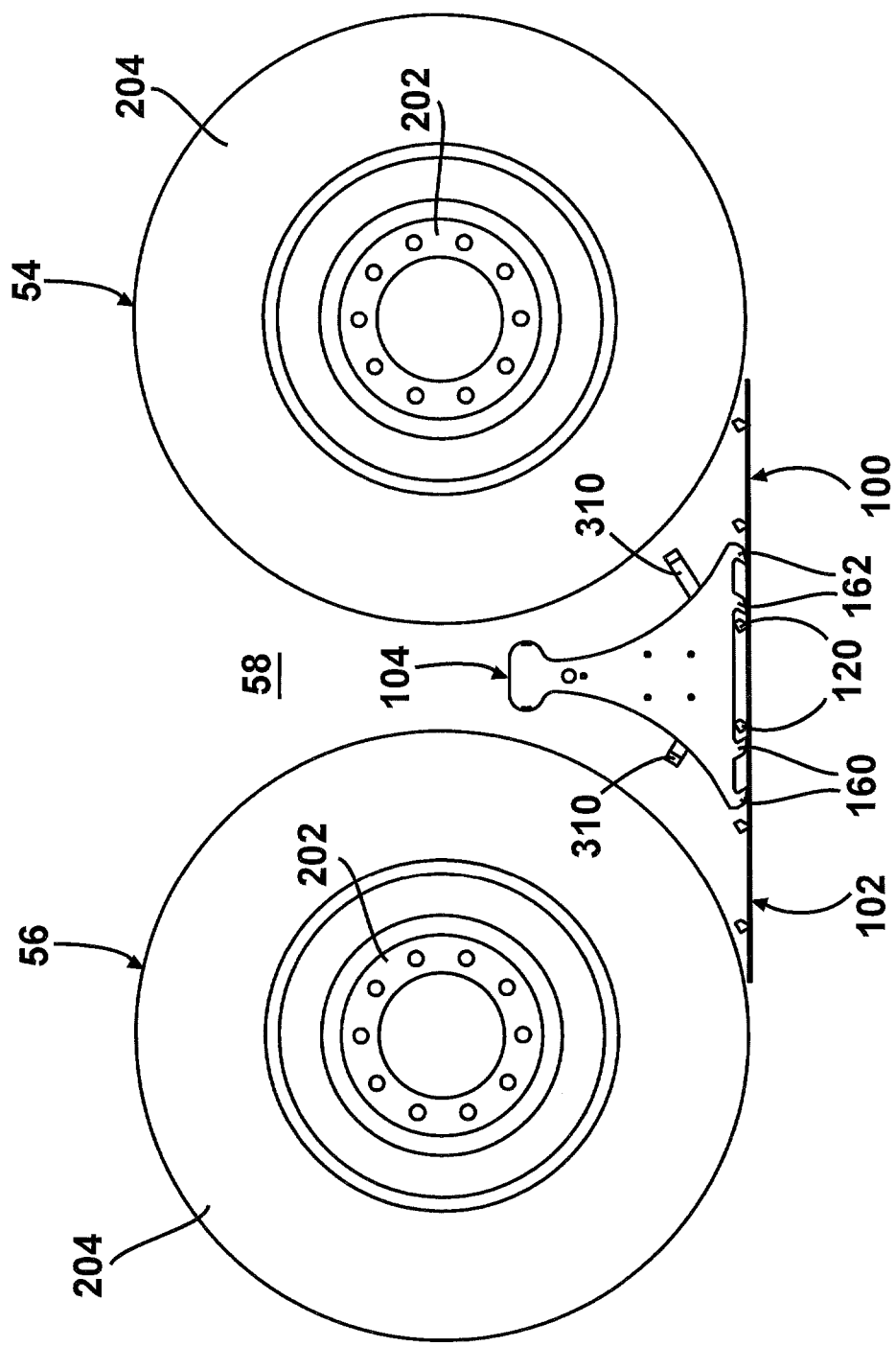
FIG. 9 is a side view of what is shown in FIG. 8.

FIG. 8 is a view similar to FIG. 7 but where the tandem wheels 54, 56 of the generic vehicle 52 of FIGS. 1 to 3 are also shown. These tandem wheels 54, 56 correspond to the tandem wheels 54, 56 shown in FIGS. 1 to 3. FIG. 9 is a side view of what is shown in FIG. 8.

It should be noted that only the exterior wheels are shown.

As can be seen, each wheel 54, 56 includes a rigid rim 202 and a tire 204 that is mounted around the rim 202. The rim 202 is bolted or otherwise removably attached to a rotating element mounted to a corresponding axle of the vehicle 52. The tire 204 is made of an elastic material, for instance a material including rubber or the like. The illustrated tire 204 is a gas-inflated pneumatic tire filled with gas under pressure, for instance pressurized air. Pneumatic tires for trucks are often pressurized at about 100 psi. Variants are also possible. For instance, the tire 204 could be constructed without having a gas-inflated interior.

Figure 10:
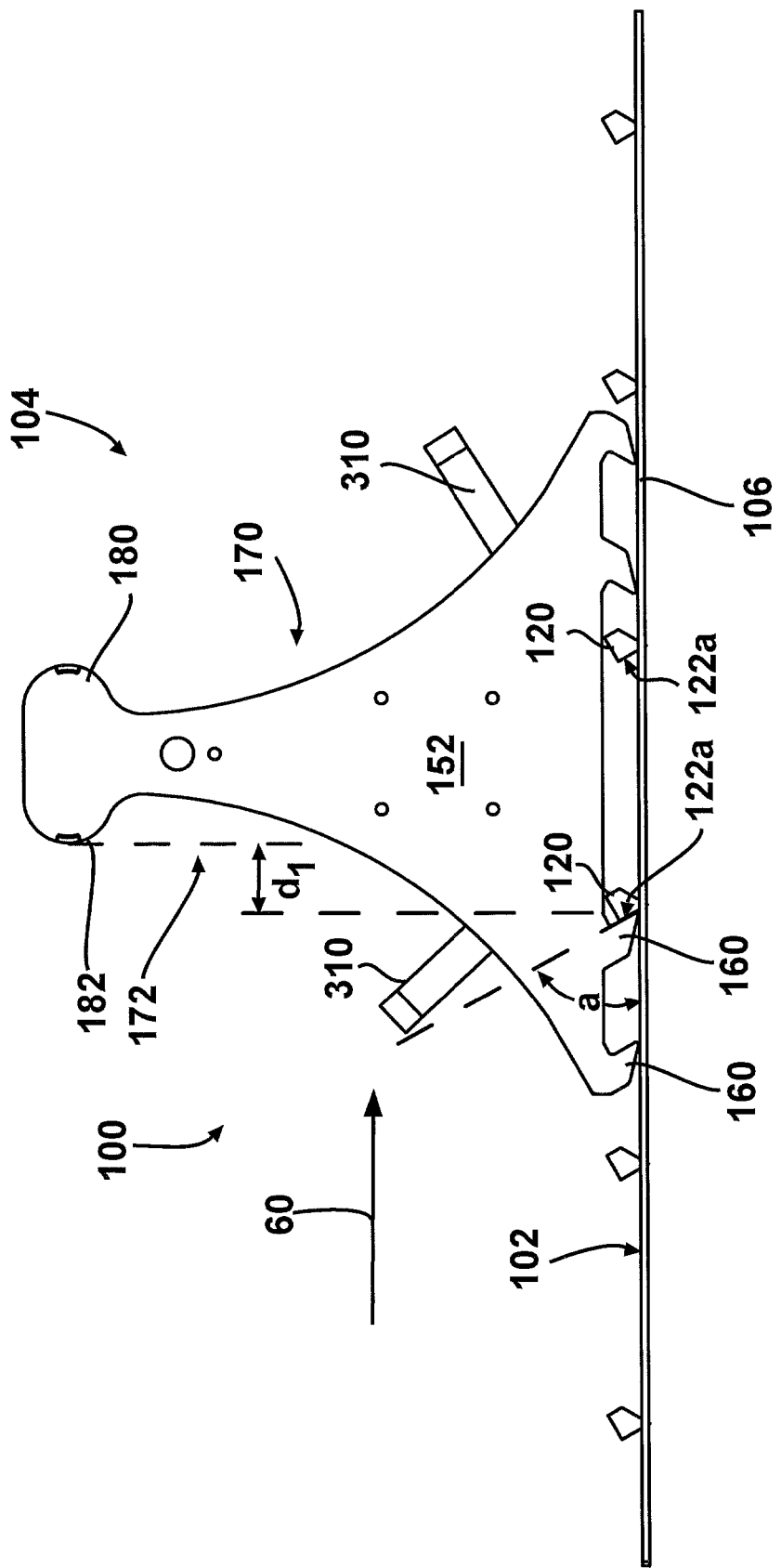
FIG. 10 is an enlarged side view of only the wheel chock and of a subsection of the base plate section of FIG. 9, the wheel chock being in a forward wheel-blocking position.

FIG. 10 is an enlarged side view of only the wheel chock 104 and of a subsection of the base plate section 102' of FIG. 9. The wheel chock 104 is depicted in a forward wheel-blocking position. This is the limit position in case the vehicle 52 attempts to depart in the forward travel direction 60. In this case, the rear tandem wheel 56 of the illustrated example will push the wheel chock 104 on its rear wheel-facing side 172. In the forward wheel-blocking position, at least one forward-blocking wheel chock tooth 160 engages, with a latching engagement, a corresponding one among the rear lateral surfaces 122a provided on the base plate stoppers 120.

On the base plate 102, each stopper 120 in the illustrated example has two opposite surfaces, namely one referred to as the rear lateral surface 122a and one referred to as the front lateral surface 122b. They are extending in the lengthwise direction of the stoppers 120. The lateral surfaces 122a, 122b are both rectilinear, flat and uninterrupted in the illustrated example. Variants are possible as well.

The base plate 102 minimally includes at least one rear lateral surface 122a and also at least one front lateral surface 122b. Most implementations would preferably include a base plate 102 having a plurality of rear lateral surfaces 122a and also a plurality of front lateral surfaces 122b. There will also preferably be a regular spacing between the rear lateral surfaces 122a and a regular spacing between the front lateral surfaces 122b. The distance between two successive rear lateral surfaces 122a and the distance between two successive front lateral surfaces 122b are preferably equal so as to simplify the design and also the positioning of the wheel chock 104 during use of the restraint system 100. Variants, however, remain possible.

The bottom base portion of the illustrated wheel chock 104 includes a plurality of substantially downwardly-projecting teeth 160, 162. The teeth 160 are oriented in opposite direction with reference to the teeth 162. These wheel chock teeth 160, 162 are designed to engage the lateral surfaces 122a, 122b on corresponding ones of the base plate stoppers 120, respectively. Each of the wheel chock teeth 160, 162 is configured and disposed to hold the double-sided wheel chock 104 in one travel direction 60, 62 when they engage a corresponding one of the lateral surfaces 122a, 122b. The wheel chock teeth 160 are referred to hereafter as the forward-blocking wheel chock teeth 160 and the wheel chock teeth 162 are referred to hereafter as the rearward-blocking wheel chock teeth 162. The restraint system 100 is designed so that once the double-sided wheel chock 104 is properly placed on the base plate 102, it can move between two limit positions. One of these limit positions is referred to as the forward wheel-blocking position. The other is referred to as the rearward wheel-blocking position.

Figure 11:
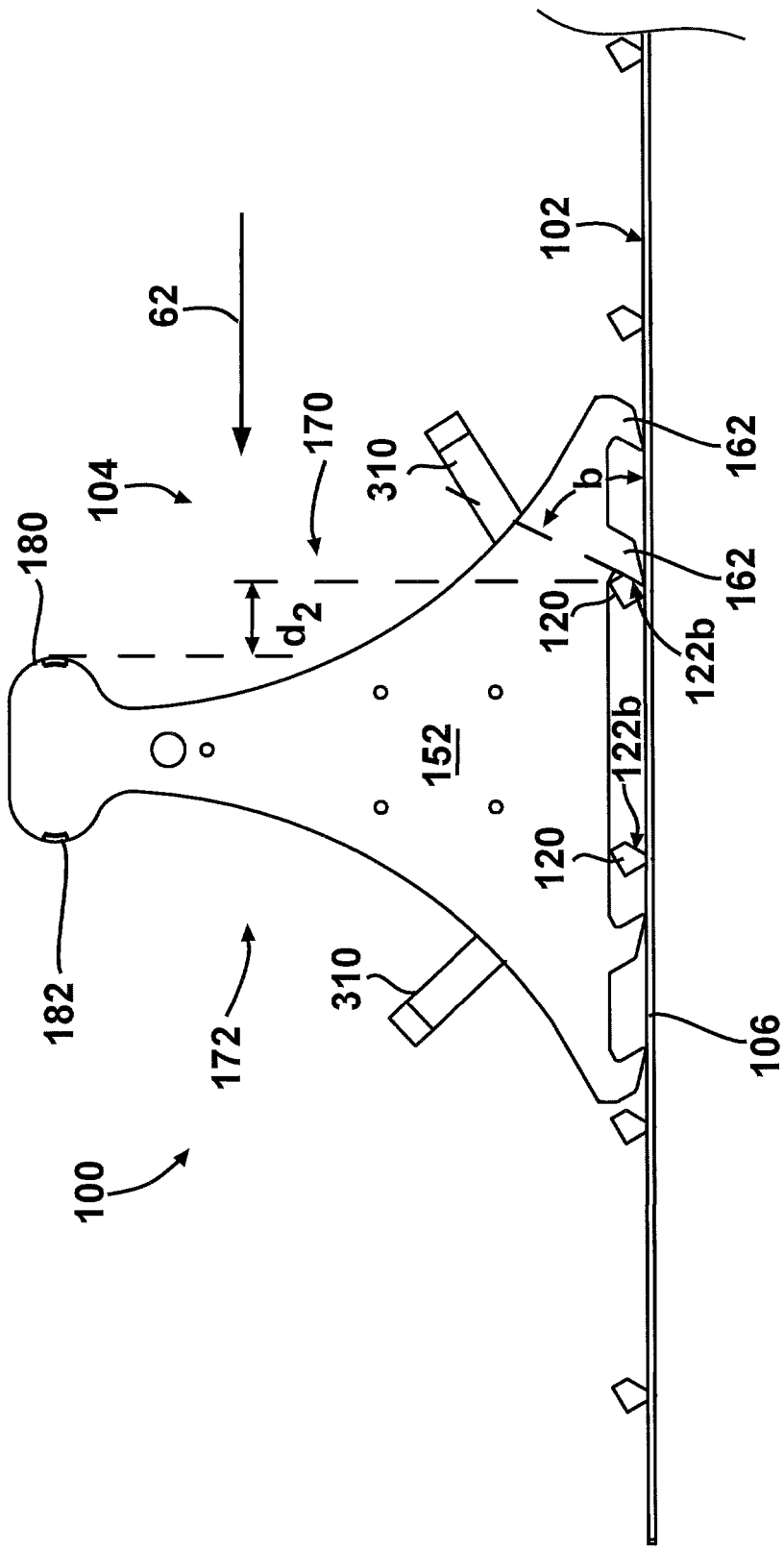
FIG. 11 is a view similar to FIG. 10 but where the wheel chock is in a rearward wheel-blocking position.

FIG. 11 is a view similar to FIG. 10 but where the wheel chock 104 is depicted in a rearward wheel-blocking position. This is the limit position in case the vehicle 52 attempts to depart in the rearward travel direction 62. In this case, the front tandem wheel 54 of the illustrated example will push the wheel chock 104 on its front wheel-facing side 170. In the rearward wheel-blocking position, at least one rearward-blocking wheel chock tooth 162 engages, in a latching engagement, the front lateral surface 122b provided on a corresponding one of the base plate stoppers 120.

The wheel chock teeth 160, 162 include slanted surfaces ending at relatively sharp tips. These sharp tips fit almost entirely under the corresponding lateral surfaces 122a, 122b. The sharp tips can also be useful in cold weather conditions if the base plate 102 has ice or snow thereon. Variants are possible.

The spacing between the wheel chock teeth 160, 162 is designed so that the wheel chock 104 can fit at any position along the base plate 102 without interfering. This provides a greater flexibility in the adjustment of the positioning of the wheel chock 104 on the base plate 102. This is a desirable feature but it is possible to proceed differently in some implementations.

It should be noted here that each wheel chock tooth 160, 162 in the illustrated example is made of multiple sections that are parallel to one another and that are in registry with one another in the widthwise direction. As best shown in FIG. 7, the wheel chock teeth 160, 162 are machined into the bottom edge of the main side members 152. Tooth sections were also created under a central reinforcing flange located on the underside of the main body 150 of the wheel chock 104. Corresponding spaced-apart tooth sections form together a single tooth 160, 162. Variants are possible.

The wheel chock 104, in its double-sided single version as shown, can slide back and forth in the longitudinal direction between the two limit positions. The spacing distance between these two limit positions is generally of a few centimeters. This distance depends, among other things, on the spacing between two adjacent lateral surfaces 122a, 122b and on the configuration of the wheel chock teeth 160, 162. Moreover, the maximum distance over which the vehicle 52 can move as the wheel chock 104 transits from one limit position to another will be minimally equal to the horizontal distance between the tire tread of any one of the tandem wheels 54, 56 and the corresponding bulge engagement point on the wheel chock 104 when the wheel chock 104 will be in one of its limit positions. Most filling stations or other kinds of driveways can allow or resist variations in the position of the vehicle 52 to some degree while the procedures are carried out. The maximum distance over which the vehicle can move back and forth, however, must not compromise safety and remain below the threshold of what is acceptable for the intended purpose. Otherwise, the restraint system 100 with two opposite wheel chocks should be considered instead of using the single double-sided one. This may be the case if the distance between the tandem wheels 54, 56 is relatively important and the maximum distance of the vehicle motion is found to be above an acceptable threshold.

As can be seen, the lateral surfaces 122a, 122b of the stoppers 120 in the illustrated example are symmetrical with reference to a vertical lengthwise-extending plane, when the stoppers 120 are attached on the plate 106. The cross section of the illustrated stoppers 120, however, is non-symmetrical due to the fact that the lateral surface 122a, 122b were machined from a workpiece having a square-shaped cross section. Variants are possible.

In the illustrated example, each lateral surface 122a, 122b is disposed at approximately 60 degrees with reference to the top surface of the plate 106. The exact value of the angles, namely angle "a" in FIG. 10 and angle "b" in FIG. 11, can vary but angles of about 60 degrees were found to provide a very good latching engagement without compromising strength. Installation and removal of the wheel chock 104 also remain easy when the angles are around this value. Increasing an angle above 60 degrees progressively increases the risks of experiencing a wheel chock tipping if the forces applied on the wheel chock 104 are relatively strong. Decreasing an angle well below 60 degrees will, at one point, start decreasing the strength of the wheel chock teeth 160, 162 since the average thickness at their tips will also decrease in order to fit in the remaining space. The thickness will eventually become too small to resist if the forces applied on the wheel chock 104 are relatively strong.

In the illustrated example, the forward-blocking wheel chock tooth 160 is positioned, in the longitudinal direction, at the rear of the rear wheel-engaging bulge 182. There is a distance $d_1$ between the rear lateral side of the rear wheel-engaging bulge 182 and the bottom edge of the rear lateral surface 122a against which the forward-blocking wheel chock tooth 160 engages when the wheel chock 104 is in a forward wheel-blocking position, as shown in FIG. 10. Likewise, there is a distance d2 between the front lateral side of the front wheel-engaging bulge 180 and the bottom edge of the front lateral surface 122b against which the rearward-blocking wheel chock tooth 162 engages when the wheel chock 104 is in a rearward wheel-blocking position, as shown in FIG. 11. This configuration and the fact that each wheel chock tooth 160, 162 is in a latching engagement with a corresponding one of the lateral surfaces 122a, 122b mitigate the risks of tipping of the wheel chock 104.

Figure 12:
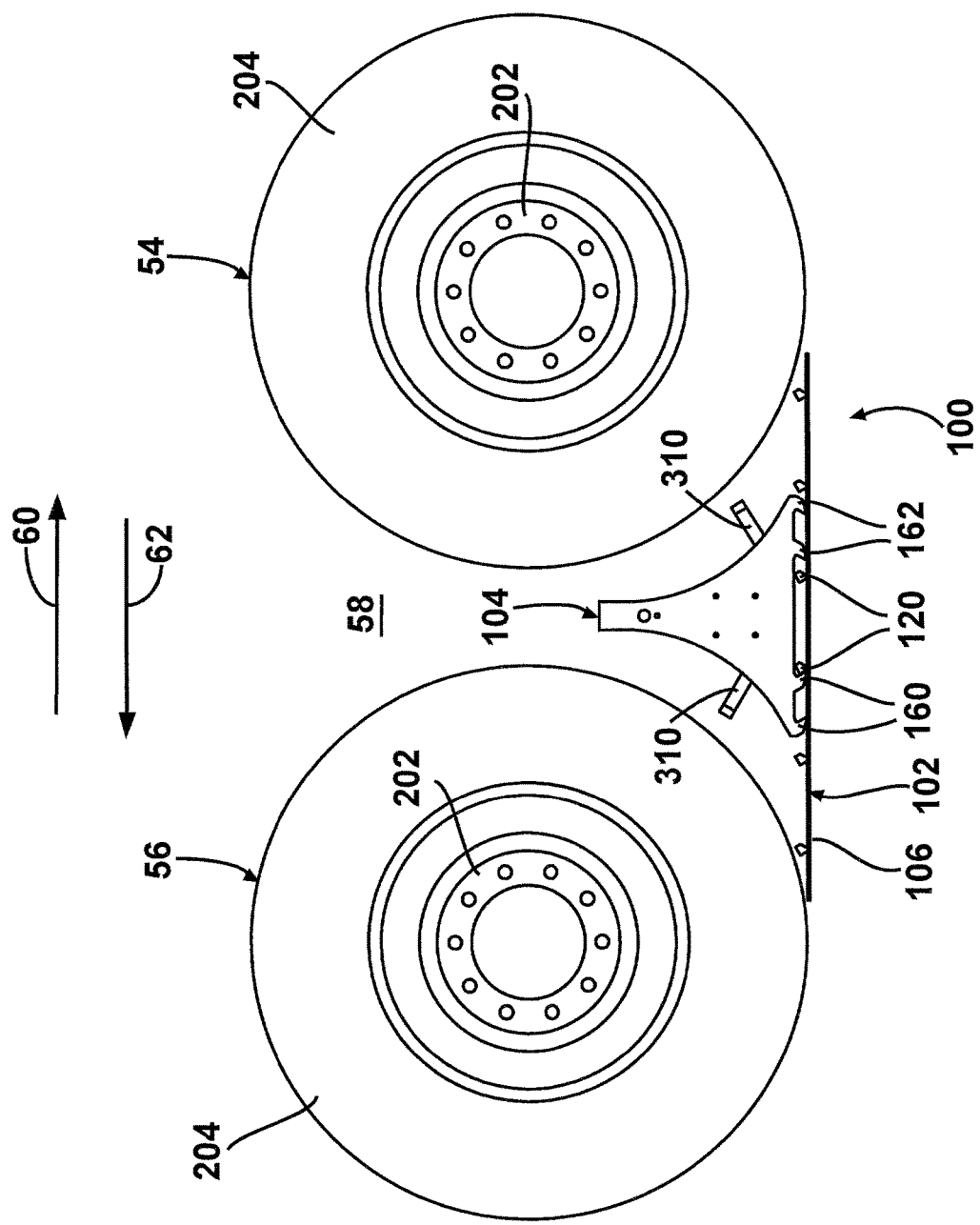
FIG. 12 is a side view of another example of a bidirectional wheel chock restraint system in accordance with the proposed concept.

FIG. 12 is a side view of another example of a bidirectional wheel chock restraint system 100 in accordance with the proposed concept. The restraint system 100 in FIG. 12 is similar to that shown in FIG. 7. However, this wheel chock 104 does not include bulges. It rather includes two opposite continuous curved surfaces on each side.

Figure 13:
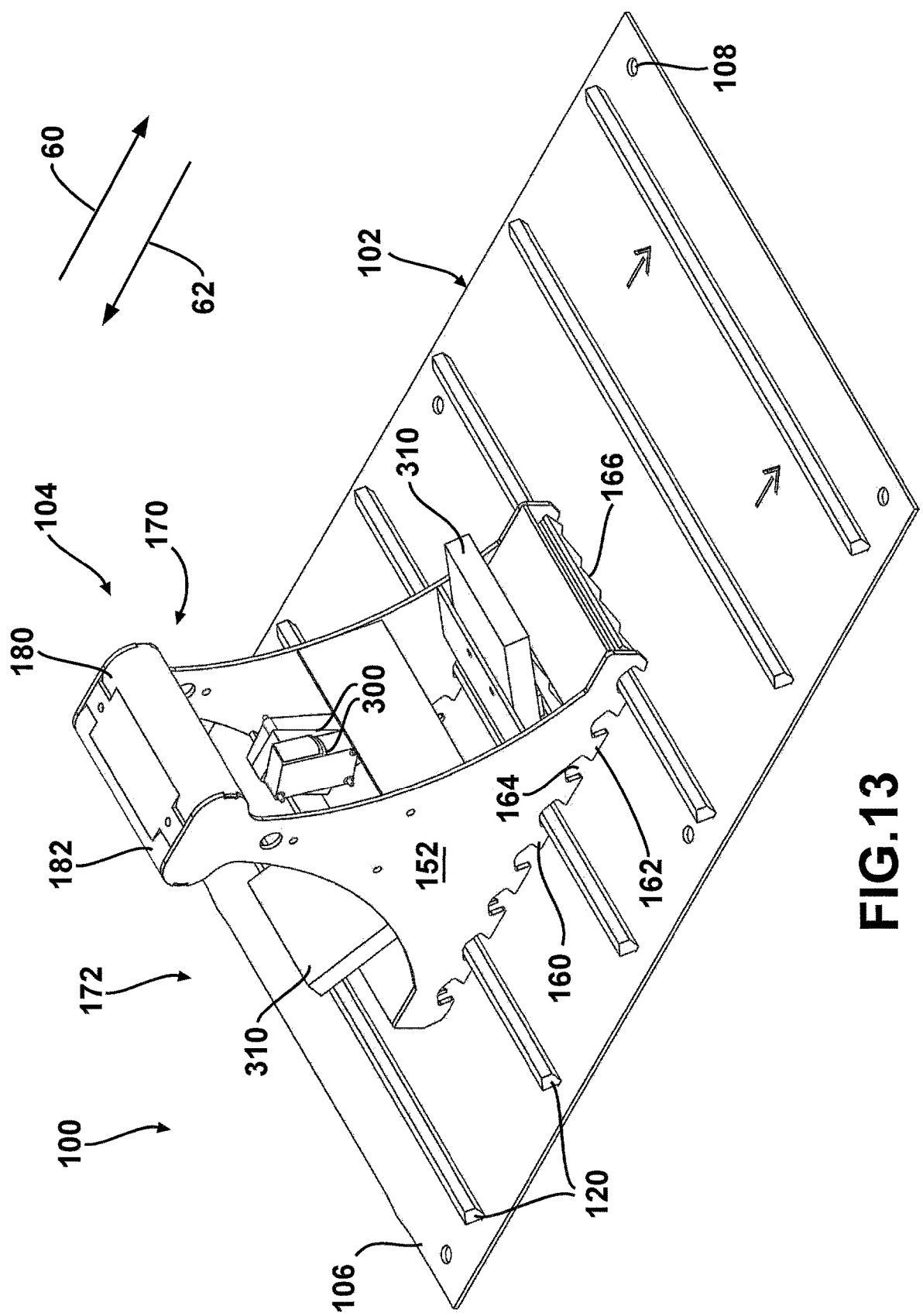
FIG. 13 is an isometric view of another example of a bidirectional wheel chock restraint system in accordance with the proposed concept.
Figure 14:
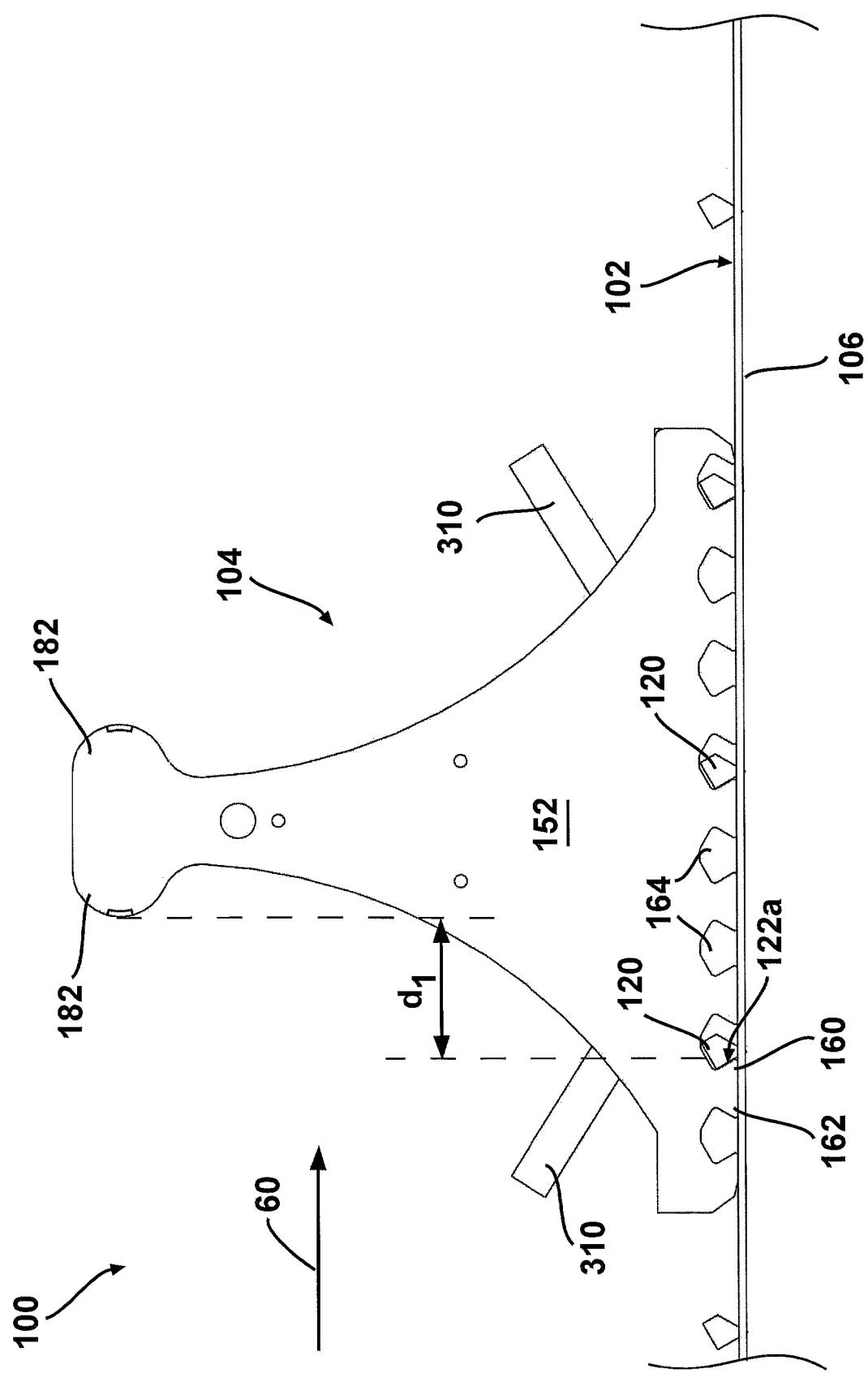
FIG. 14 is an enlarged side view of the restraint system of FIG. 13.

FIG. 13 is an isometric view of another example of a bidirectional wheel chock restraint system 100 in accordance with the proposed concept. FIG. 14 is an enlarged side view of the restraint system 100 of FIG. 13.

The restraint system 100 of FIGS. 13 and 14 includes the base plate 102 as shown for instance in FIG. 7. It also includes a single double-sided wheel chock 104 having a construction that is similar to that of FIG. 7, with the exception of its bottom side where the wheel chock teeth 160, 162 are located. In this example, most of the forward-blocking wheel chock teeth 160 and of the rearward-blocking wheel chock teeth 162 are formed on the same parts. The bottom edge portion of the wheel chock 104 includes a plurality of openings 164 machined or otherwise formed on the main side members 152. The remaining parts between these openings 164 form the wheel chock teeth 160, 162, with the front edges forming the forward-blocking wheel chock teeth 160 and the rear edges forming the rearward-blocking wheel chock teeth 162. Only the wheel chock teeth 160, 162 at the opposite ends are not paired.

Also, unlike in the restraint system 100 of FIG. 7, the wheel chock 104 in FIGS. 13 and 14 have three forward-blocking wheel chock teeth 160 simultaneously engaging three rear lateral surfaces 122a when the wheel chock 104 is in a forward wheel-blocking position, as in FIG. 14. Although the rearward wheel-blocking position for this example is not shown, one can easily see that the same number of rearward-blocking wheel chock teeth 162 will then engage three front lateral surfaces 122b. The sliding distance between the two wheel-blocking positions is also minimized since each stopper 120 always remains inside a corresponding one of the openings 164.

The wheel chock 104 shown in FIG. 13 further includes a transversal bottom edge 166 that is provided with a series of downwardly-projecting teeth. A similar one is provided on the other side. These transversal bottom edges 166 can be useful when the base plate 102 is covered with ice or snow. They can also be use on other models of wheel chocks and/or one can omit them from the implementation shown in FIGS. 13 and 14.

Figure 15:
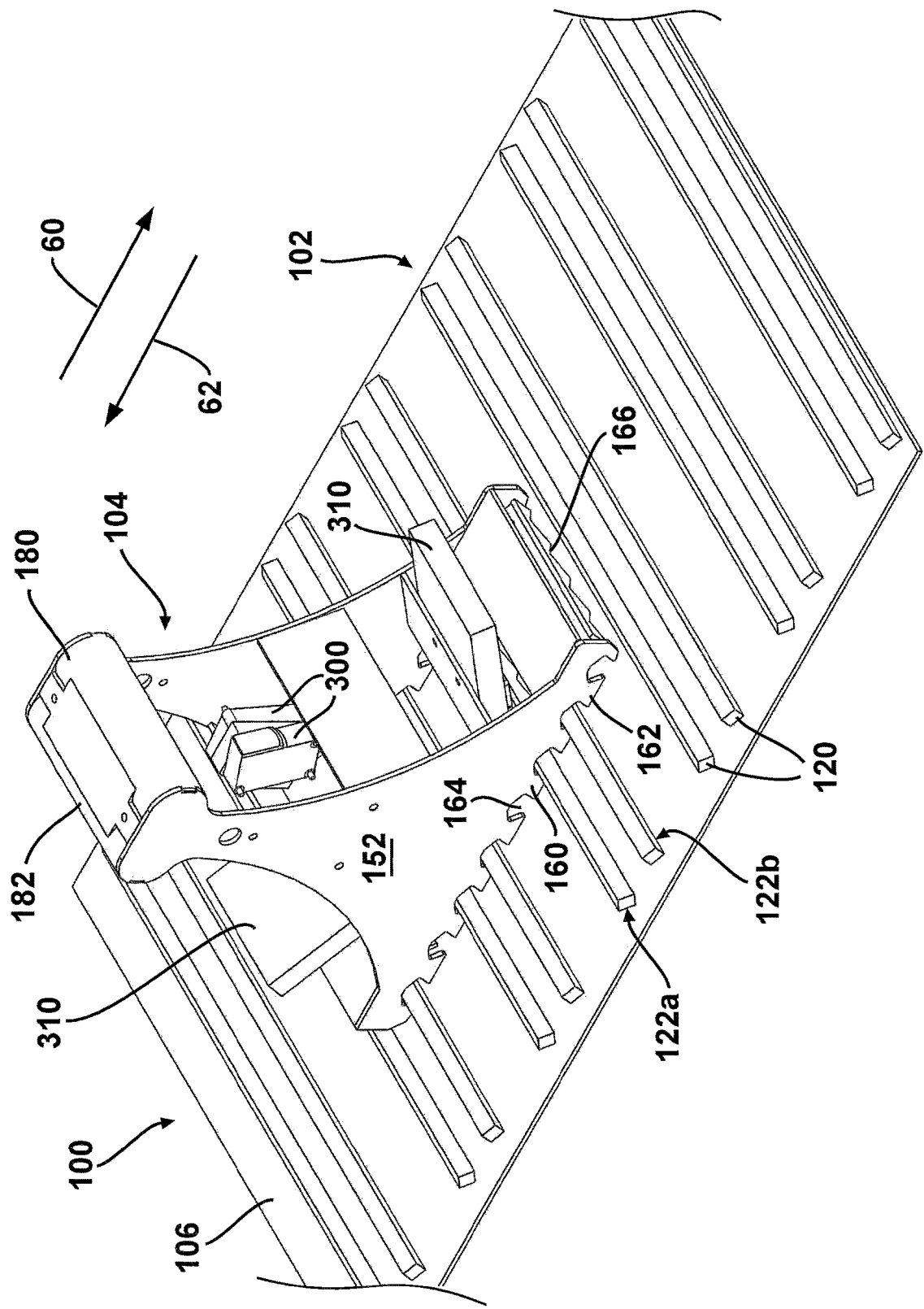
FIG. 15 is an isometric view of another example of a bidirectional wheel chock restraint system in accordance with the proposed concept.
Figure 16:
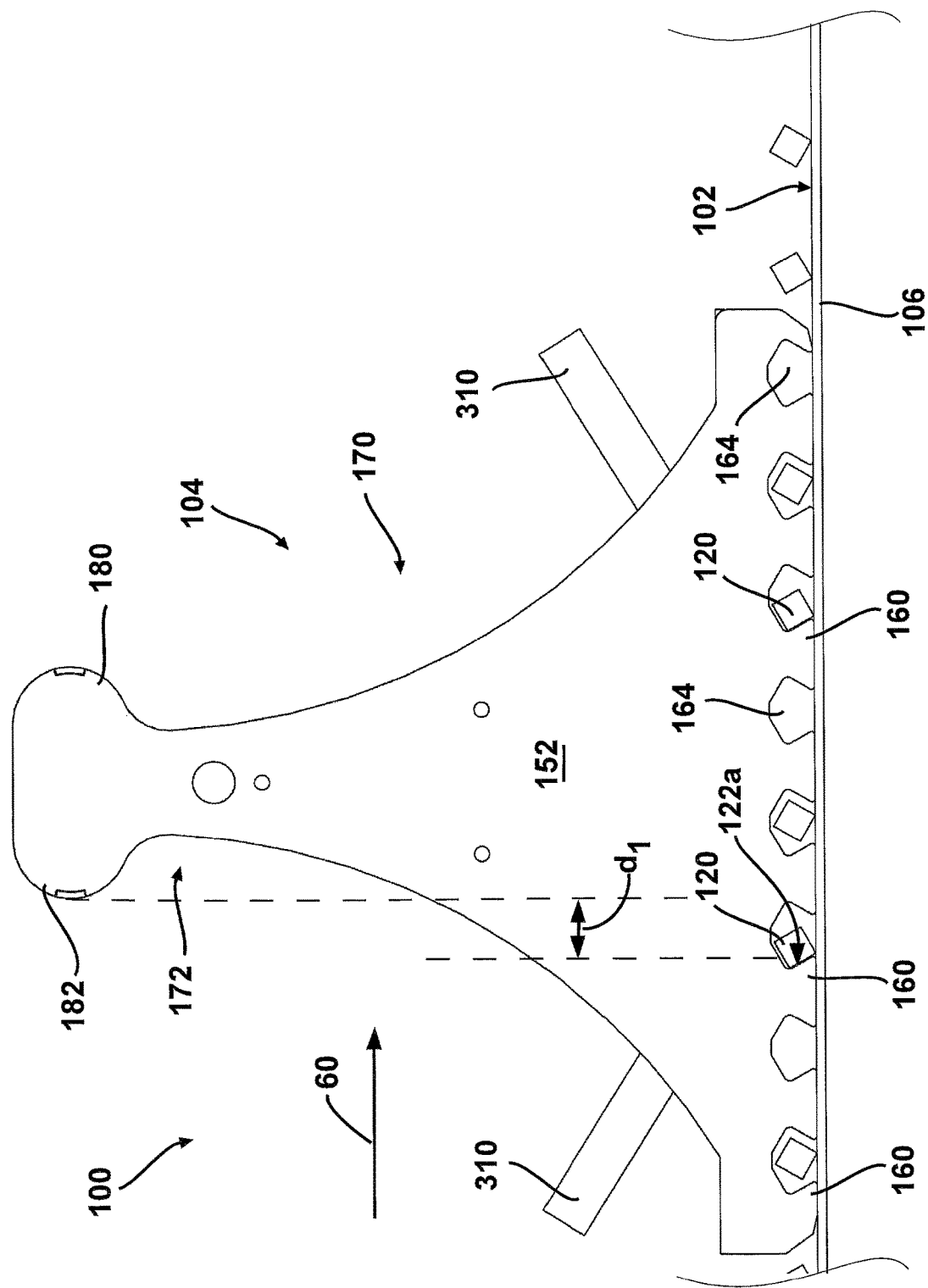
FIG. 16 is an enlarged side view of the restraint system of FIG. 15, the wheel chock being in a forward wheel-blocking position.
Figure 17:
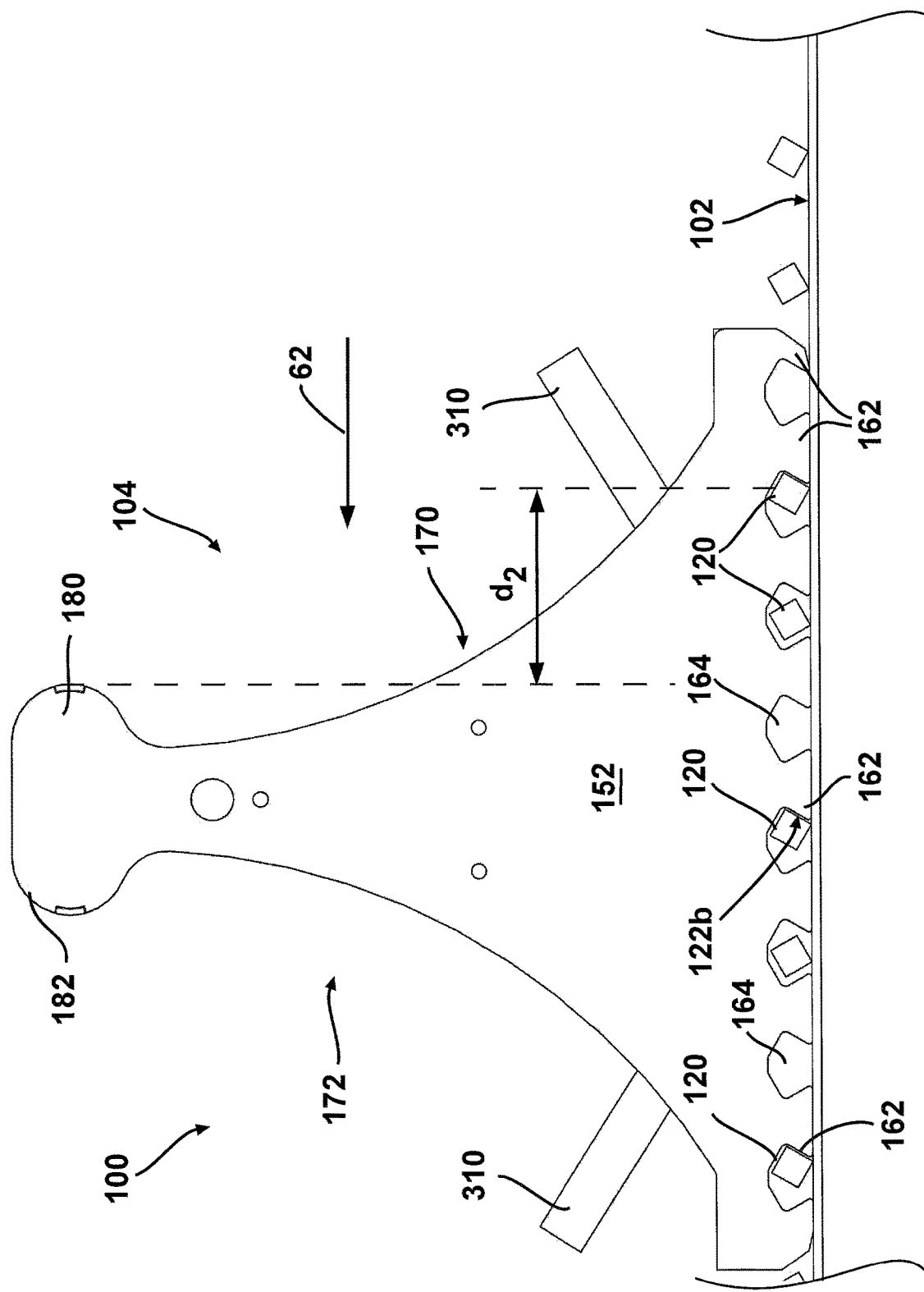
FIG. 17 is a view similar to FIG. 16 but where the wheel chock is in a rearward wheel-blocking position.

FIG. 15 is an isometric view of another example of a bidirectional wheel chock restraint system 100 in accordance with the proposed concept. FIG. 16 is an enlarged side view of the restraint system 100 of FIG. 15 where the wheel chock 104 is in a forward wheel-blocking position. FIG. 17 is a view similar to FIG. 16 but where the wheel chock 104 is in a rearward wheel-blocking position.

The restraint system 100 of FIGS. 15 to 17 includes a single double-sided wheel chock 104 that is similar to that of FIGS. 13 and 14. However, the base plate 102 includes stoppers 120 that are configured in pairs. In each pair, there is a first stopper 120 on which is provided a rear lateral surface 122a and a second stopper 120 on which is provided a front lateral surface 122b. If desired, one could also use this base plate 102 with the wheel chock 104 of FIG. 7.

Figure 18:
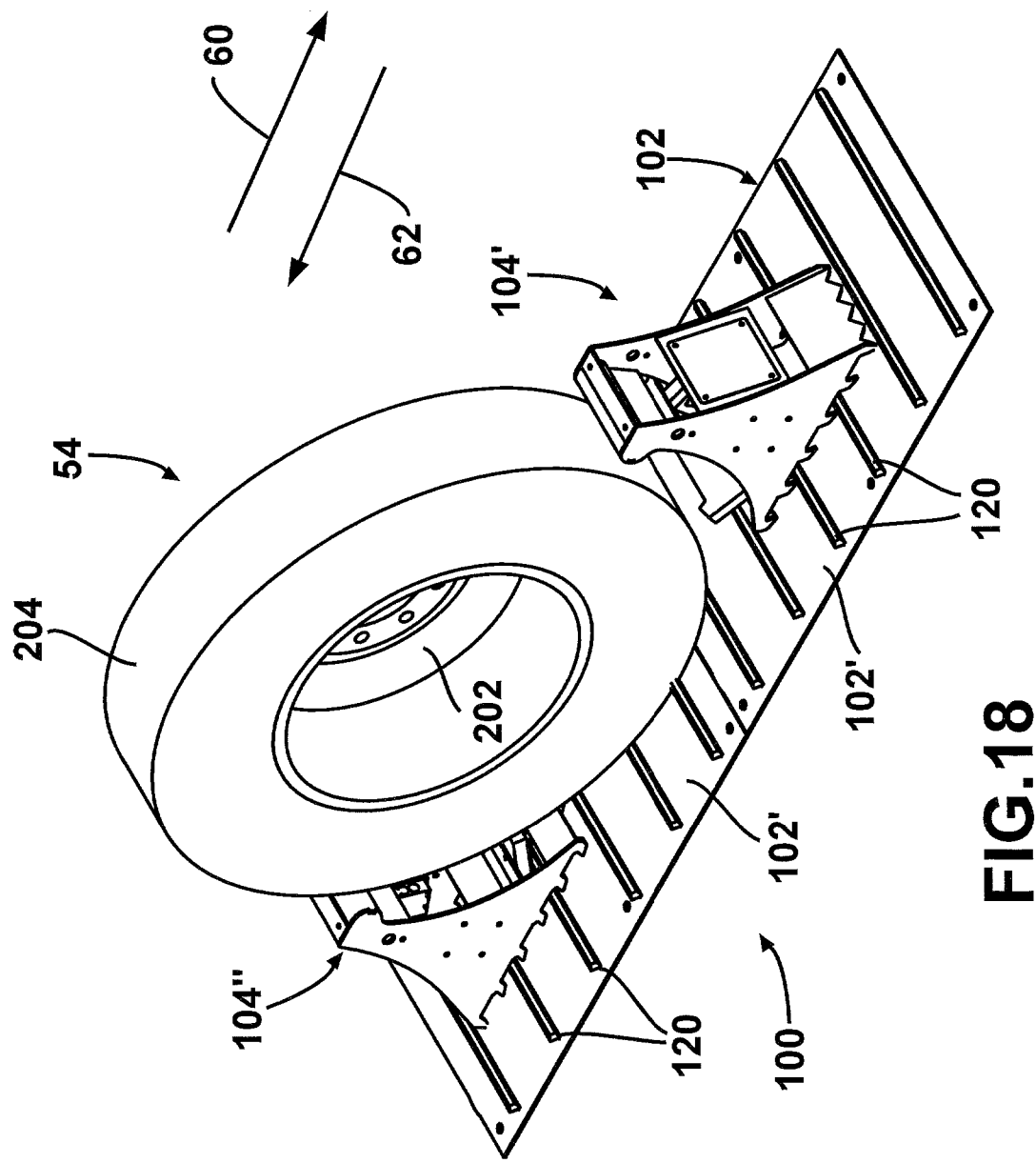
FIG. 18 is an isometric view of another example of a bidirectional wheel chock restraint system in accordance with the proposed concept.
Figure 19:
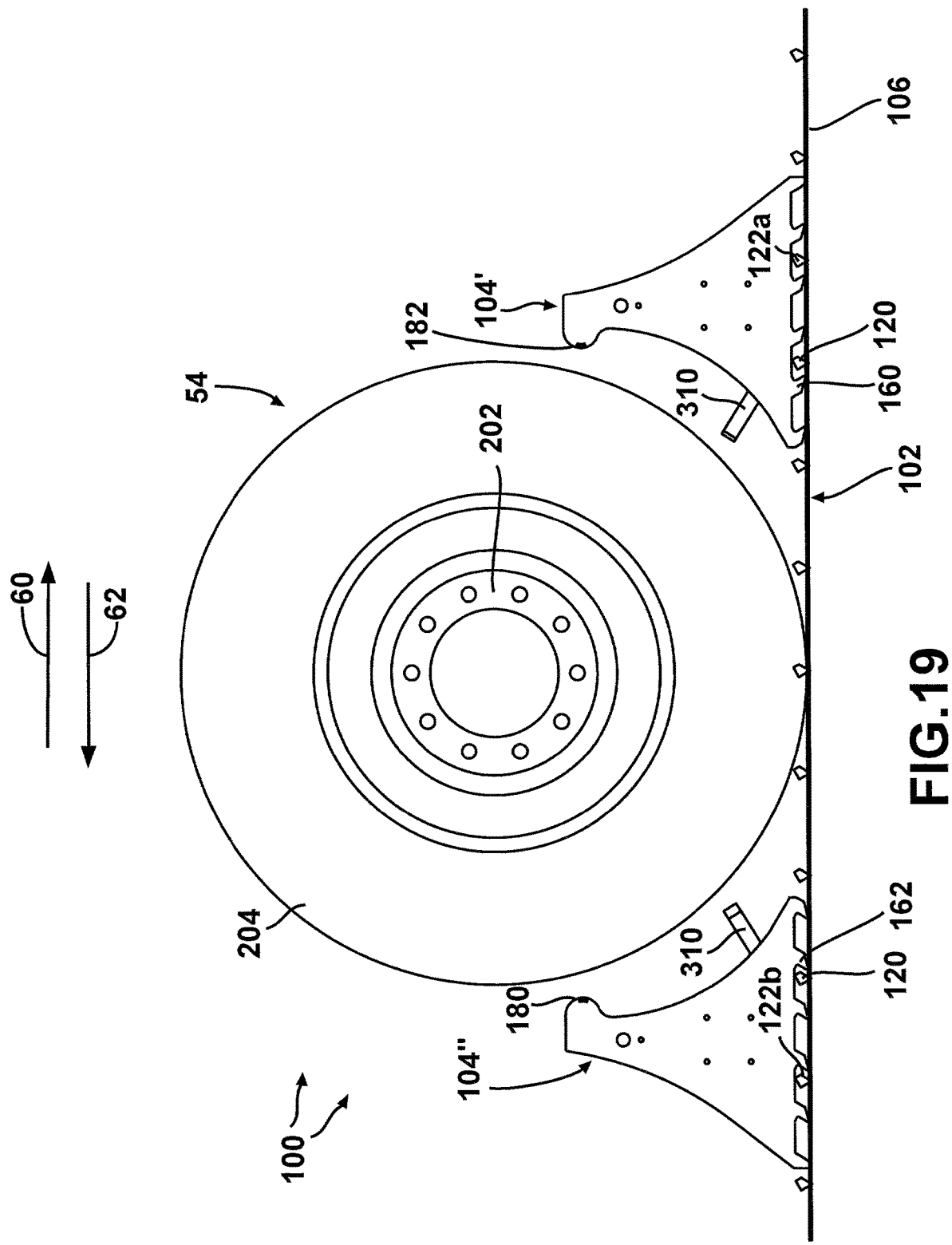
FIG. 19 is a side view of the restraint system of FIG. 18.

FIG. 18 is an isometric view of another example of a bidirectional wheel chock restraint system 100 in accordance with the proposed concept. FIG. 19 is a side view of the restraint system 100 of FIG. 16. Unlike the restraint systems in the preceding examples, the restraint system 100 includes two opposite single-sided wheel chocks and is designed for use around a single wheel or in opposite directions on two different wheels that are part of a same wheel set. One of the two wheel chocks is referred to as the front wheel chock 104' and the other as the rear wheel chock 104".

In the illustrated example, the wheel chocks 104', 104" of the restraint system 100 are set around a same wheel. This wheel is shown as being the wheel 54. Although this wheel 54 was presented earlier as a given one of the tandem wheels, the restraint system 100 with the two wheel chocks 104', 104" is not restricted for use around a tandem wheel. In fact, this implementation can be used on vehicles devoid of tandem wheels. Both wheel chocks 104', 104" cooperate with the same base plate 102. The base plate 102 in this example is identical to be one of FIG. 7 but variants are possible.

If the wheel chocks 104', 104" of the restraint system 100 are used around two different wheels of a same wheel set, the front wheel chock 104' will be placed immediately in front of a first one of the wheels and the rear wheel chock 104" will be placed immediately behind a second one of the wheels of the wheel set while at least one of these two vehicle wheels rests over the base plate 102. For instance, one can use the restraint system 100 with two wheel chocks 104', 104" where the front wheel chock 104' is located in front of the wheel 54 of the vehicle 52 of FIGS. 1 to 3, and the rear wheel chock 104" is located behind the wheel 56. Wheels that are considered to be part of a same wheel set will often be wheels that are on a same side and not too far apart. A wheel set can be formed by closely-placed wheels or by all wheels of a vehicle, depending on the situation.

If desired, one can provide a linking arrangement between the two wheel chocks 104', 104", for instance an arrangement that includes one or more cables, chains, elastic bands, rigid elements and/or others to interconnect the two wheel chocks 104', 104". This will keep them relative close to one another and can mitigate the risks of having someone placing, by mistake or ignorance, only one of the two wheel chocks 104', 104". The linking arrangement can also mitigate the probabilities of having positioning two wheel chocks 104', 104" with the same orientation on two different wheels.

The front wheel chock 104' includes at least one forward-blocking wheel chock tooth 160 and the rear wheel chock 104" includes at least one rear-blocking wheel chock tooth 162. However, in the example depicted in FIGS. 18 and 19, they each have more than one corresponding tooth 160, 162. There are also two teeth 160 on the front wheel chock 104' and two teeth 162 on the rear wheel chock 104" that can engage simultaneously corresponding lateral surfaces 122a, 122b when they are in their respective limit positions.

In the illustrated example, the two wheel chocks 104', 104" are identical and they are only oriented differently. This simplifies manufacturing and handling. Nevertheless, one can provide wheel chocks 104', 104" having different constructions.

Figure 20:
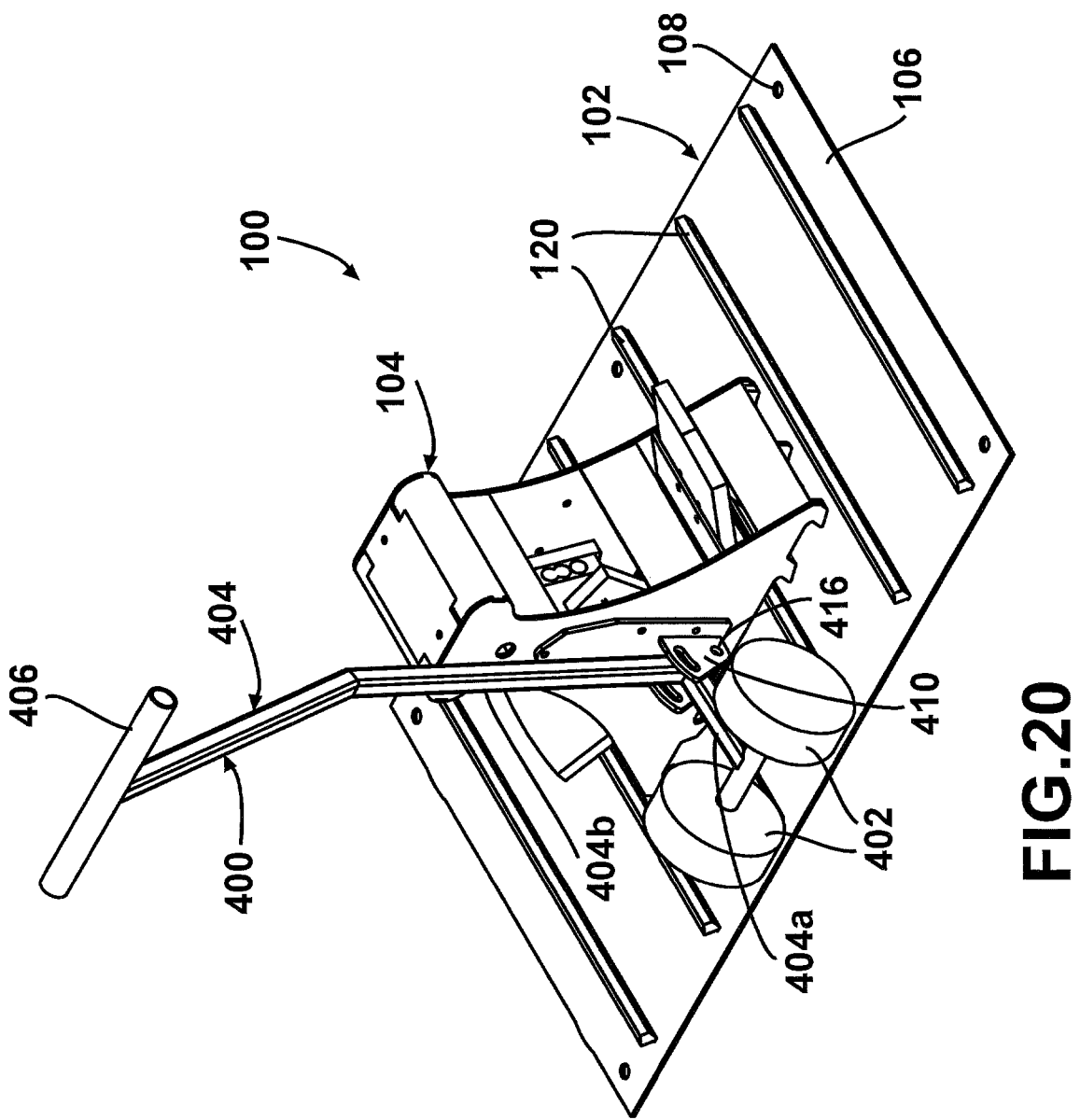
FIG. 20 is an isometric view of an example of a wheel chock repositioning cart.
Figure 21:
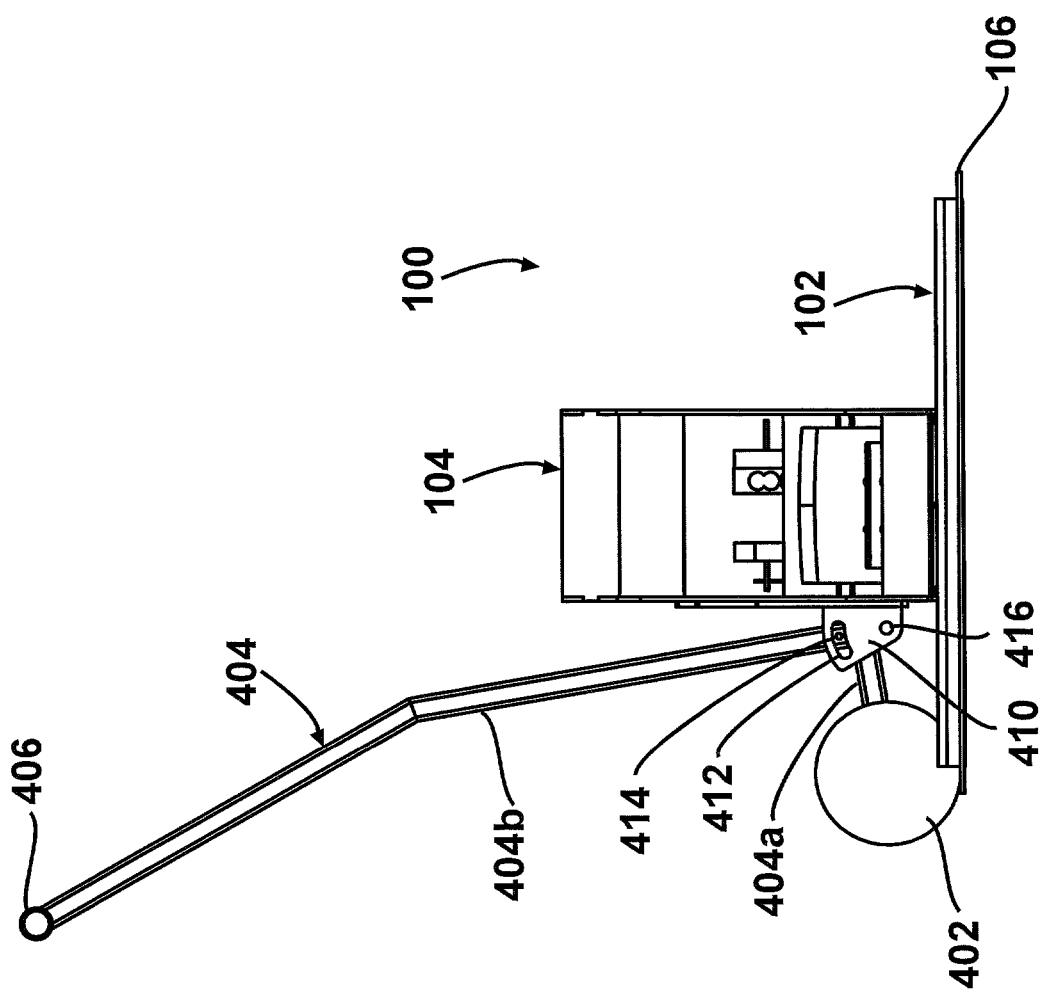
FIG. 21 is a front end view of what is shown in FIG. 20.
Figure 22:
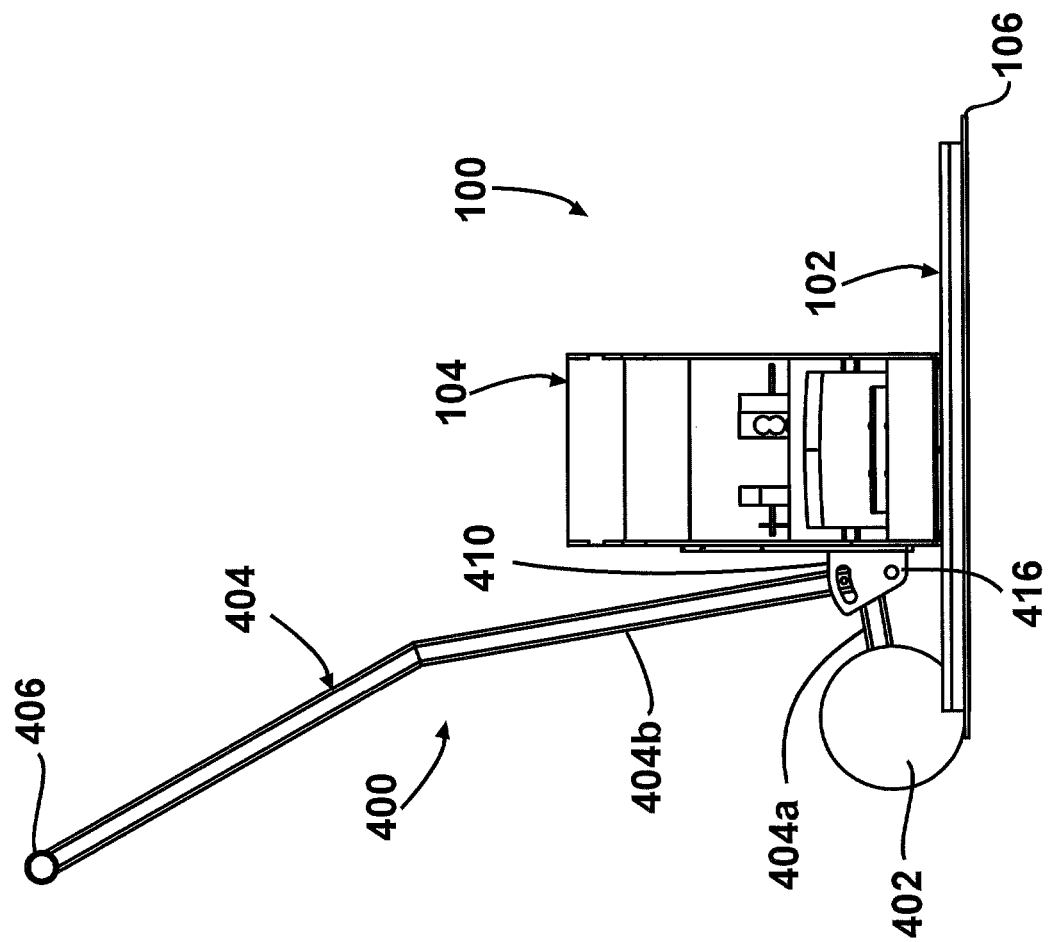
FIG. 22 is a view similar to FIG. 21 but where the bracket was partially cut away for the sake of illustration.
Figure 23:
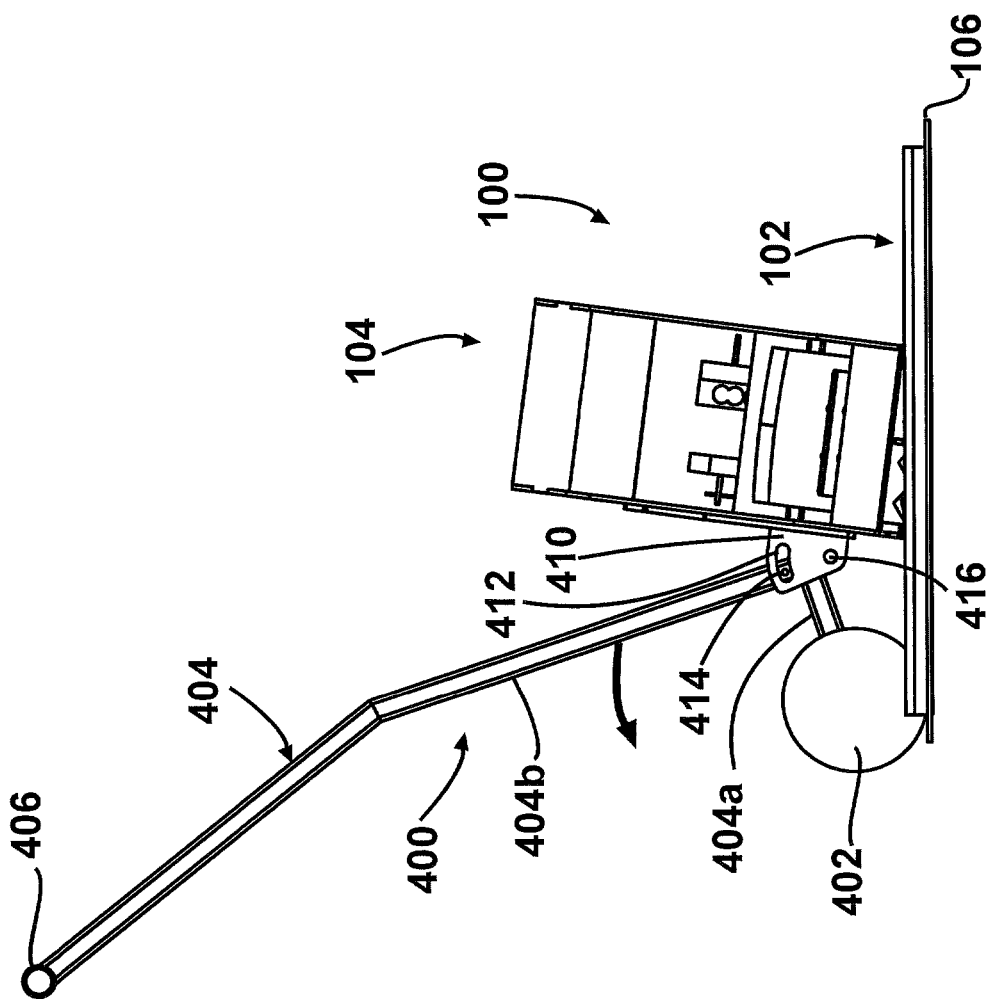
FIGS. 23 and 24 are front end views sequentially illustrating how the wheel chock is further lifted off the base plate using the wheel chock repositioning cart of FIG. 20.
Figure 24:
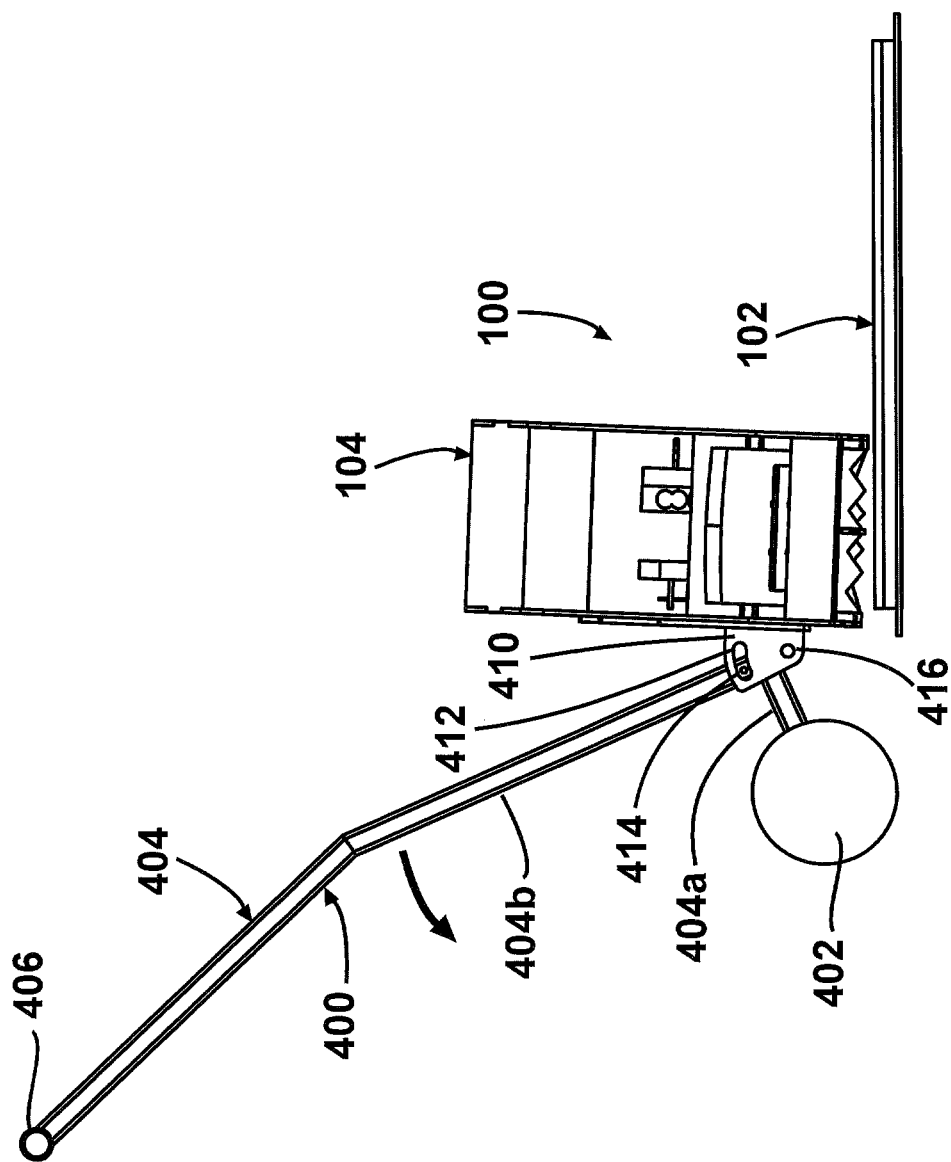

FIG. 20 is an isometric view of an example of a wheel chock repositioning cart 400. FIG. 21 is a front end view of what is shown in FIG. 20. FIG. 22 is a view similar to FIG. 21 but where the bracket was partially cut away for the sake of illustration. FIGS. 23 and 24 are front end views sequentially illustrating how the wheel chock 104 is further lifted off the base plate 102 using the wheel chock repositioning cart 400 of FIG. 20. The cart 400 can also be seen in FIGS. 1 to 3.

The cart 400 is designed to create a lifting (or lowering) motion in three phases that can facilitate handling of the wheel chock 104, particularly when the intervening space between two tandem wheels is small. The cart 400 helps clearing the rim 190 around the base plate 102 but prevents the wheel chock 104 to be excessively tilted during handling. Tilting the wheel chock 104 too much would make one side of the wheel chock 104 going too high compared to the other. It should be noted that the rim 190 is not shown in FIG. 20 but it can be seen in FIGS. 21 to 24.

The illustrated cart 400 includes a pair of wheels 402 and a lever 404 at the top end of which is provided a handle 406. The pair of wheels 402 is attached at the end of a first bottom section 404a of the lever 404. The lever 404 also includes a second bottom section 404b that is substantially perpendicular to the first bottom section 404a. The lever 404 is attached to the wheel chock 104 using a double-sided U-shaped bracket 410. Each side of the bracket 410 includes a corresponding arc-shaped slot 412 to guide a corresponding laterally-extending follower 414 attached to the lever 404 near the junction between the two bottom sections 404a, 404b and projecting on both sides. The lever 404 pivots around the axis of the cart wheels 402 but only in the second and third stages during a lifting motion, as shown in FIGS. 23 and 24.

When the restraint system 100 includes the two opposite wheel chocks 104', 104", each of them can include a corresponding cart such as the illustrated cart 400. Alternatively, one can construct the cart 400 where the two opposite wheel chocks 104', 104" are lifted simultaneously by the same cart to which the wheel chocks 104', 104" are connected using a longitudinally-extending beam or the like. This cart can have two wheels, or even three or more wheels.

The cart 400 is an optional feature and can be configured differently compared to that shown and described herein. It is also possible to use other methods for helping an operator in positioning the wheel chock 104 on or off the base plate 102. For instance, one can use a handle, such as a handle mounted on top thereof, or an articulated spring-assisted arm. Other arrangements and configurations are possible as well, including one where no such feature is provided.

Figure 25:
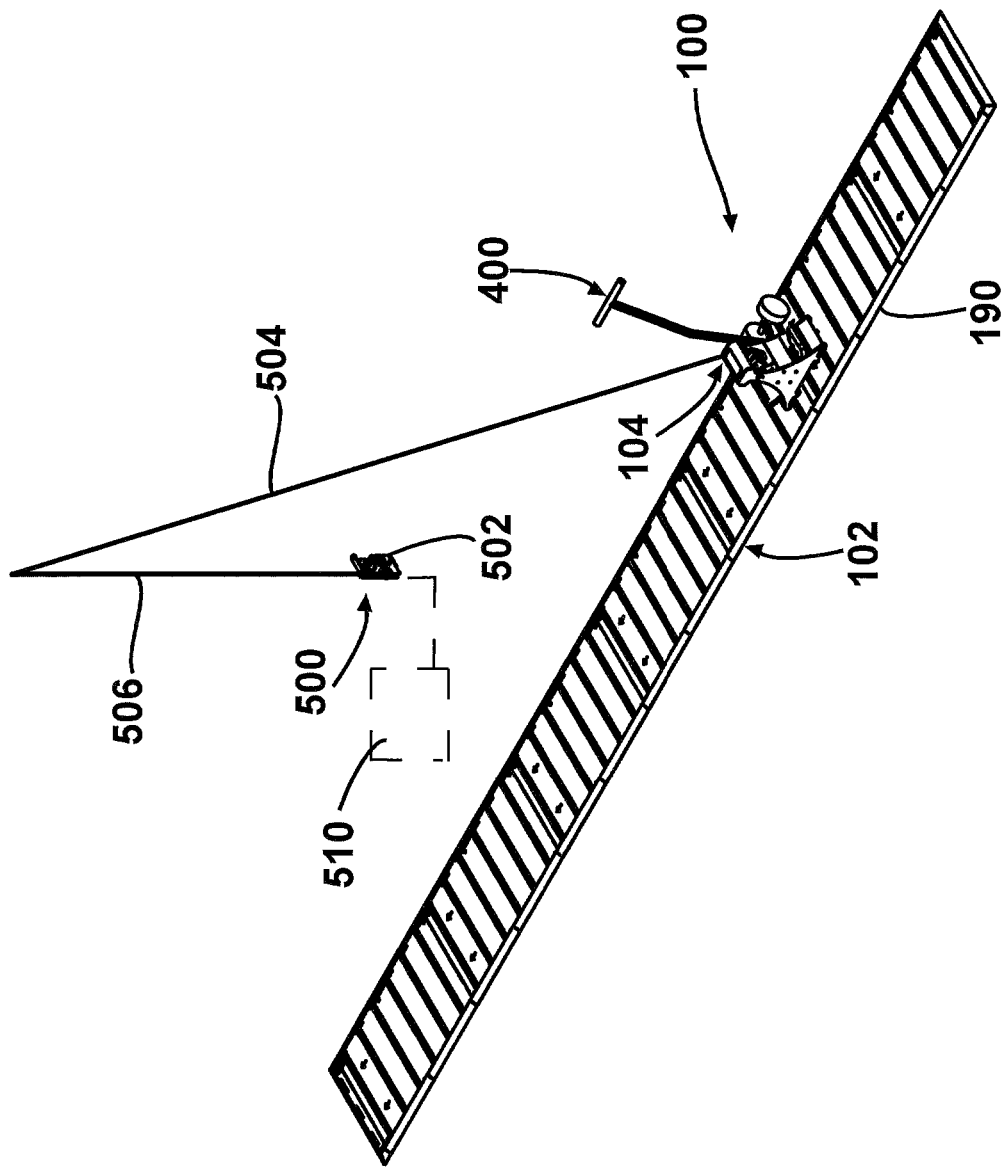
FIG. 25 is an isometric view of an example of a wired connection between a connector and an example of a wheel chock in a bidirectional wheel chock restraint system.

FIG. 25 is an isometric view of an example of a wired connection 500 between a connector 502 and a wheel chock 104 of a bidirectional wheel chock restraint system 100. This arrangement can be used when the wheel chock 104 includes sensors, such as the sensors 300 of FIG. 7. The wire connection 500 includes an electric wire 504. The electric wire 504 can actually include multiple wires, for as one to provide electrical power the sensors 300 and one for communication purposes. In this example, the electric wire 504 is supported high above the connector 502 using a flexible pole 506, for instance one made of fiberglass or the like. The bottom end of the flexible pole 506 is attached on the connector 502 and a proximal portion of the electric wire 504 extends upwards inside the flexible pole 506. The distal portion of the electric wire 504 extends between the free end at the upper tip of the flexible pole 506 and the wheel chock 104. With this arrangement, the wheel chock 104 can be positioned anywhere on the base plate 102 and the electric wire 504 will always remain above the ground. This is only one possible implementations and variants are possible as well. For instance, the sensors 300 can be powered using batteries and exchange signals with a control unit 510 or any other device through a wireless communication system.

It should be noted that although FIGS. 20 to 25 show the wheel chock 104 in its double-sided version that includes bulges 180, 182 and the wheeled cart 400. The wire connection 500 can also be implemented with other models as well or without the cart 400.

Figure 26:
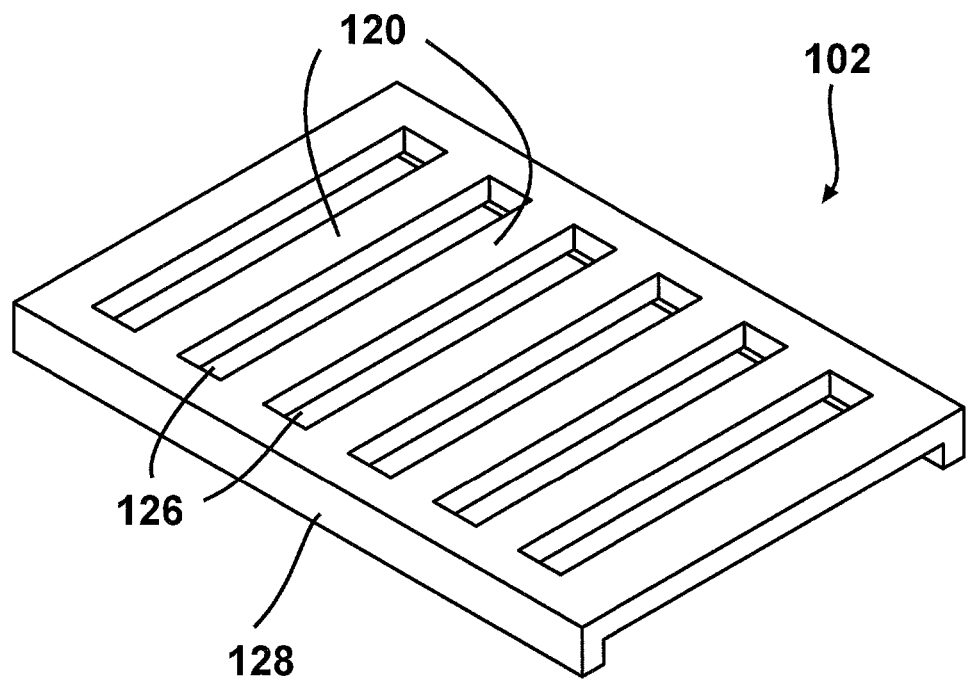
FIG. 26 is a semi-schematic view of an example of a subsection of the base plate in which the stoppers are formed between spaced-apart slots provided on a frame part.
Figure 27:
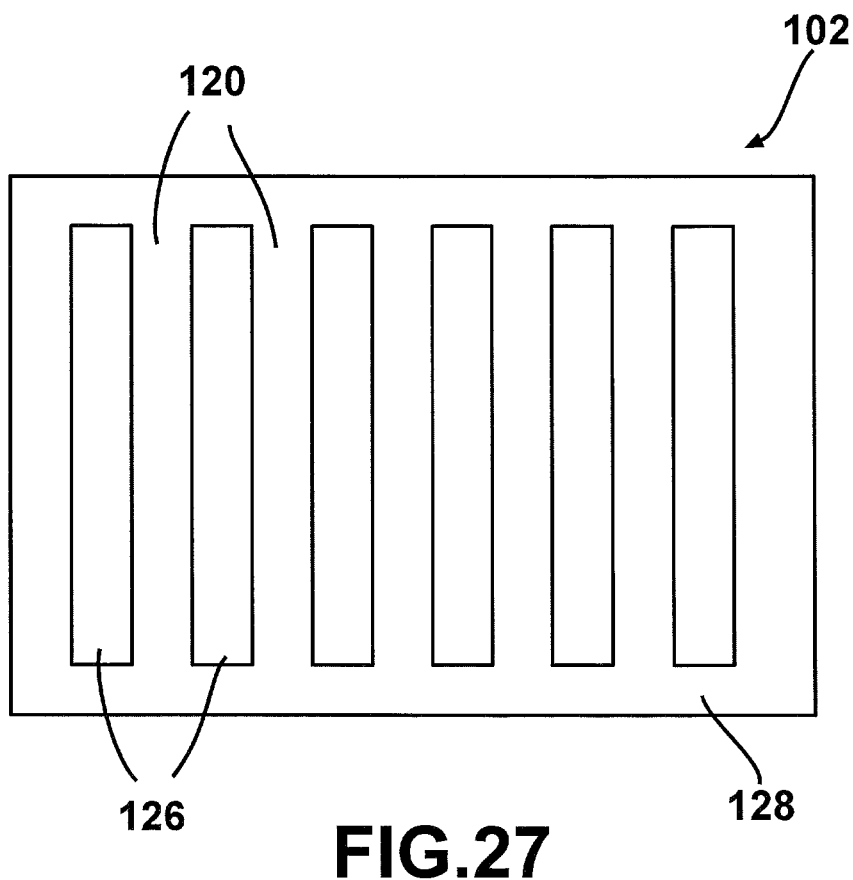
FIG. 27 is a top view of what is shown in FIG. 26.

FIG. 26 is a semi-schematic view of an example of a subsection of the base plate 102 in which the stoppers 120 are formed between relatively large spaced-apart slots 126 provided on a frame part 128. The underside of the stoppers 120 is slightly elevated from the ground surface to make room for the tip of the teeth 160, 162 of the wheel chocks. FIG. 27 is a top view of what is shown in FIG. 26.

FIGS. 26 and 27 show that the base plate 102 can be designed and constructed differently compared to what was presented earlier. Other variants are possible as well.

Figure 28:
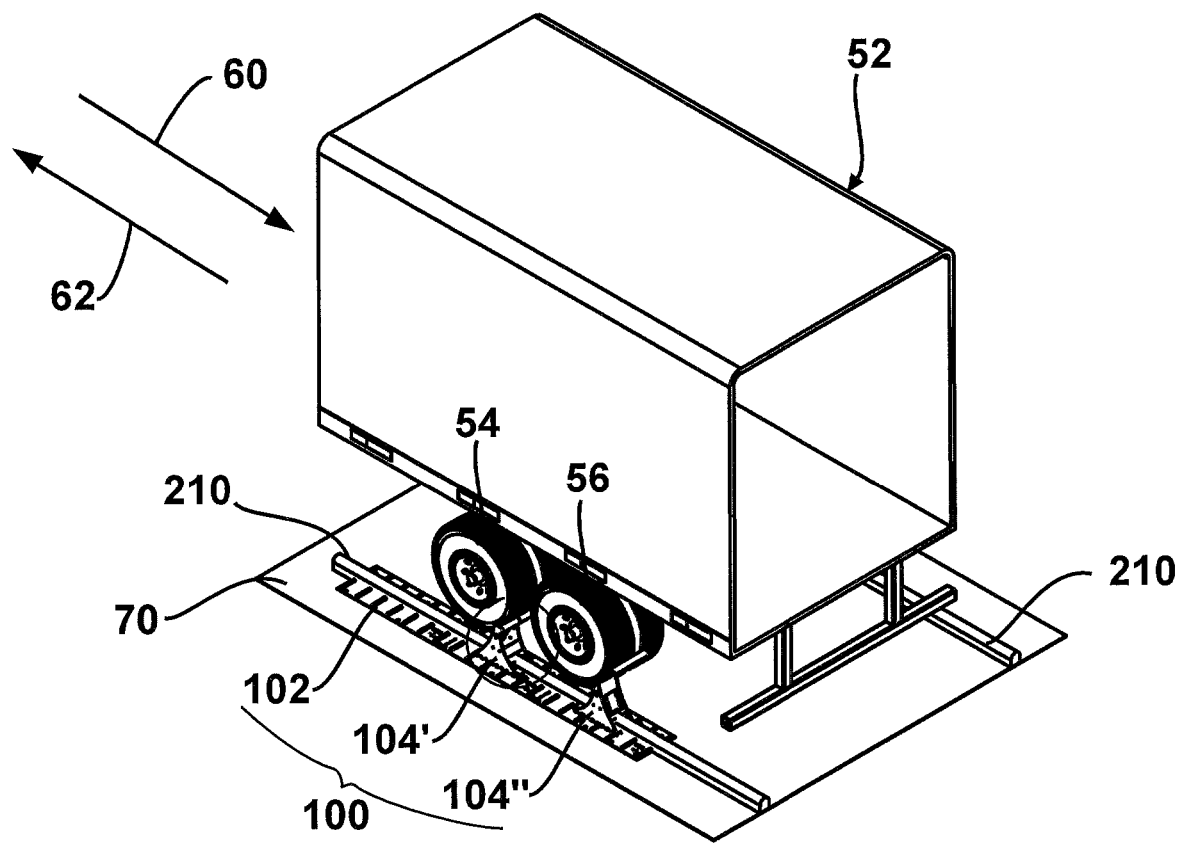
FIG. 28 is a semi-schematic view of an example of an implementation for the restraint system where the wheel chocks are laterally offset with reference to the wheels of a vehicle.

FIG. 28 is a semi-schematic view of an example of an implementation for the restraint system 100 where the wheel chocks 104', 104" are laterally offset with reference to the path of the wheels 54, 56 of the vehicle 52. This figure also shows an implementation where the two opposite wheel chocks 104', 104" are used around a same wheel 56 that is part of a tandem wheel set. Still, the illustrated wheel chocks 104', 104" are set directly over a rail 210 that extends longitudinally across the center of the base plate 102 and that projects vertically above it. Each wheel chock 104', 104" includes a corresponding channel on its bottom side that fits over the rail 210. This will prevent the wheel chocks 104', 104" from pivoting around a vertical axis and the teeth 160, 162 will still be able to latch with the base plate 102. The rail 210 is longer than the base plate 102 in the illustrated example and there is also a second rail 210 provided on the opposite side. Variants are possible as well.

Figure 29:
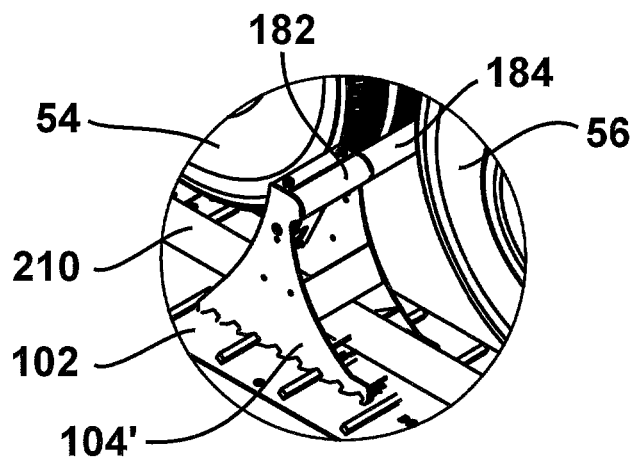
FIG. 29 is an enlarged view of the front wheel chock shown in FIG. 28.

FIG. 29 is an enlarged view of the front wheel chock 104' shown in FIG. 28. As can be seen, the rear wheel-engaging bulge 182 includes a side extension 184 that projects transversally towards the front side of the rear wheel 56. The wheel 56 will engage the side extension 184 if the vehicle 52 attempts to move in the forward travel direction 60. The wheel chock 104' will tend to pivot if a force is applied on the side extension 184 but the rail 210 will keep the wheel chock 104' aligned and in latching engagement with the base plate 102. It should be noted that the rear wheel chock 104" shown in FIG. 28 also has a similar side extension and will stop the vehicle 52 if it attempts to move in the rearward travel direction 62.

Figure 30:
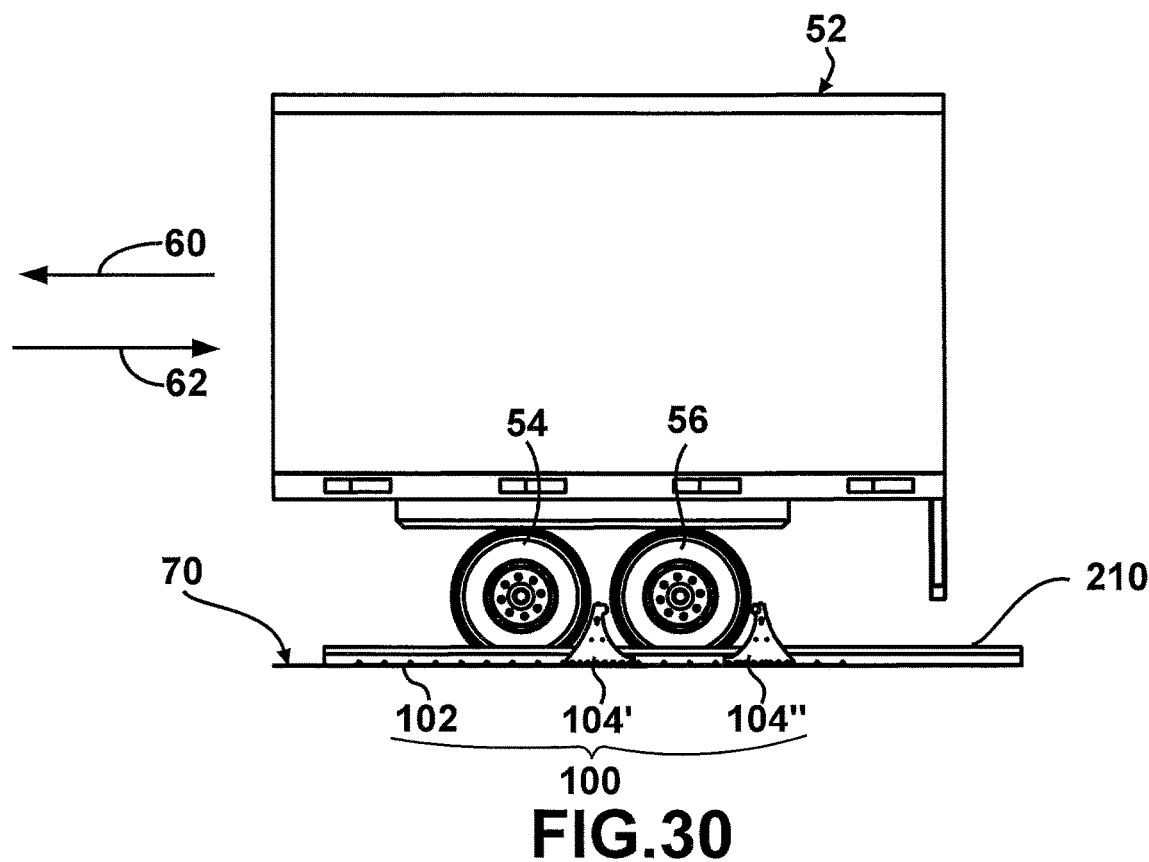
FIG. 30 is a side view of what is shown in FIG. 28.
Figure 31:
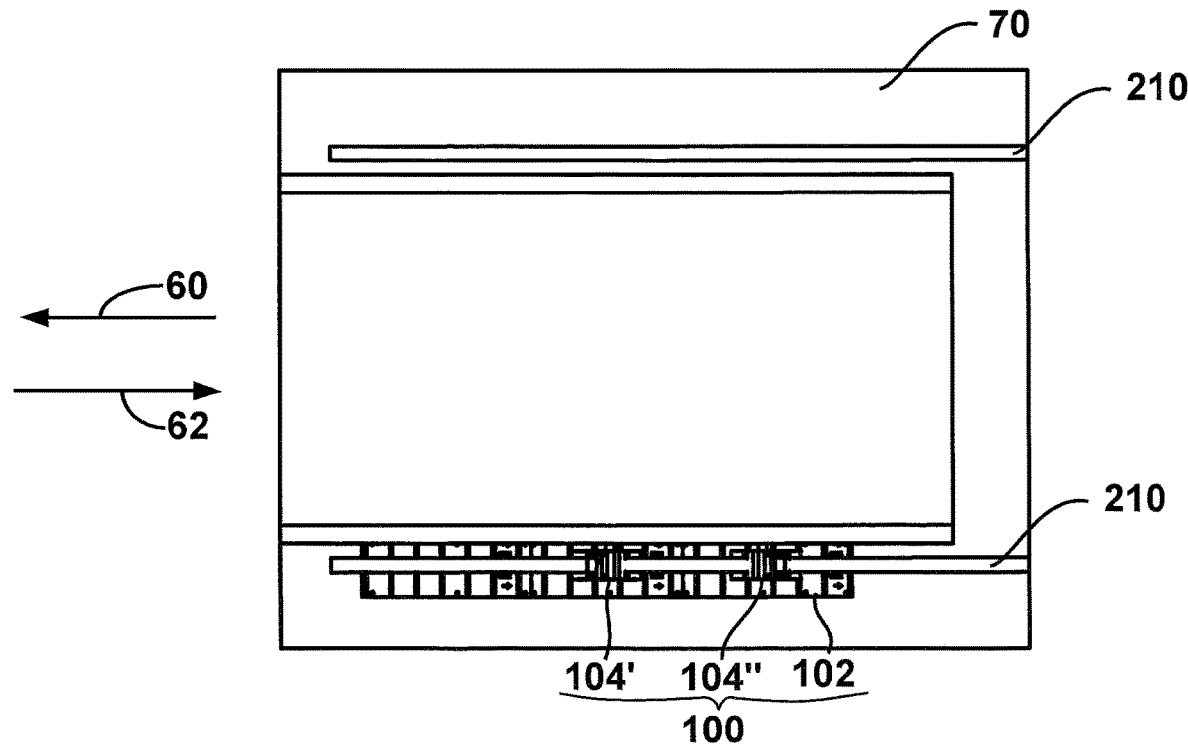
FIG. 31 is a top view of what is shown in FIG. 28.

FIG. 30 is a side view of what is shown in FIG. 28 and FIG. 31 is a top view thereof.

Figure 32:
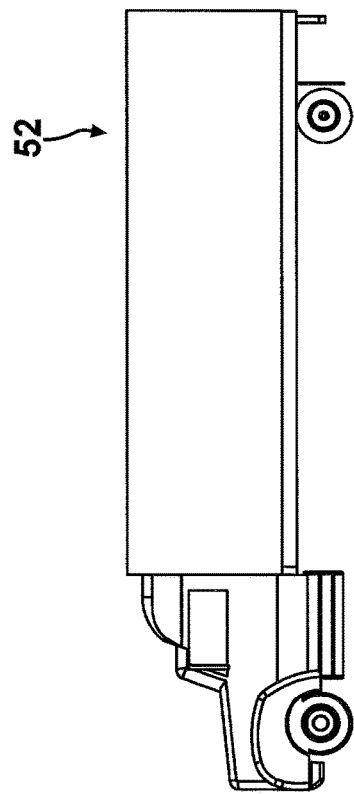
FIG. 32 is semi-schematic view of an example of a vehicle having a swap body configuration.
Figure 33:
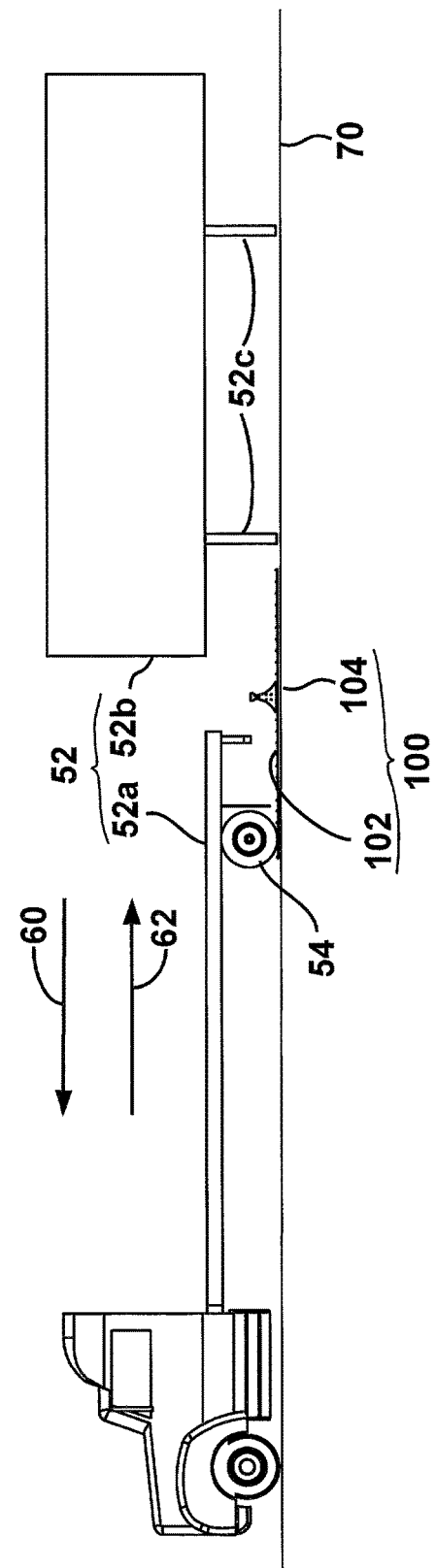
FIG. 33 shows the vehicle of FIG. 32 when the chassis and the container are unconnected to one another, and with a restraint system being located between them.

FIG. 32 is semi-schematic view of an example of a vehicle 52 having a swap body configuration.

This vehicle 52 has two basic parts, namely a chassis 52a and a container 52b that can be detached from the chassis 52a. The container 52a has supporting legs 52c to keep it above the ground when detached from the chassis 52a. FIG.

33 shows the vehicle 52 of FIG. 32 when the chassis 52a and the container 52b are unconnected to one another, and with a restraint system 100 being provided between them. The container 52b now rests on the ground surface 70 and the restraint system 100 is used for security reasons. The restraint system 100 includes a bidirectional wheel chock 104 positioned on a corresponding base plate 102. This way, the chassis 52a of the vehicle 52 is prevented from backing up, in the rearward travel direction 62, so as to be under the container 52b. The rear wheel 54 of the vehicle 52 that is located on the side where the wheel chock 104 is located will engage the wheel chock 104 and be prevented from going any further. The wheel chock 104 will only be removed when it is safe to proceed. The bidirectional wheel chock 104 could also be used to stop the vehicle 52 when parked while the chassis 52a supports the container 52b, thus if the vehicle 52 would attempt to depart in the forward travel direction 60. The front wheel of the vehicle 52 will then engage the wheel chock 104. As can be seen, this example shows a situation where a bidirectional wheel chock can be useful even if the vehicle does not have a set of tandem wheels. Other similar situations exist as well.

The present detailed description and the appended figures are meant to be exemplary only, and a skilled person will recognize that many changes can be made while still remaining within the proposed concept. For instance, the shape of the base plate teeth and the shape of the wheel chock teeth are not limited to those shown herein. Other variants are possible as well.

LIST OF REFERENCE NUMERALS 50 driveway
52 vehicle
52a chassis
52b container
52c supporting leg
54 front tandem wheel/wheel
56 rear tandem wheel
58 intervening space
60 forward travel direction
62 rearward travel direction
70 ground surface
80 framework structure
82 catwalk
100 bidirectional wheel chock restraint system
102 base plate
102' base plate section
104 double-sided wheel chock
104' front wheel chock
104" rear wheel chock
106 plate
108 hole
120 base plate stopper
122a rear lateral surface
122b front lateral surface
124 slot
126 slot
128 frame part
150 main body (of wheel chock)
152 main side member
154 transversal member
160 forward-blocking wheel chock tooth
162 rearward-blocking wheel chock tooth
164 opening
170 front wheel-facing side
172 rear wheel-facing side
180 front wheel-engaging bulge
182 rear wheel-engaging bulge
184 side extension
190 peripheral slanted rim
192 longitudinal rim portion
194 transversal rim portion
196 bracket
202 rim
204 tire
210 rail
300 sensor
310 spacer
400 wheel chock repositioning cart
402 wheel
404 lever
404a first bottom section
404b second bottom section
406 handle
410 bracket
412 slot
414 follower
416 axle
500 wired connection
502 connector
504 electric wire
506 flexible pole
510 control unit

What is claimed is:

1. A bidirectional wheel chock restraint system for a vehicle, the restraint system including:
an elongated base plate extending along a longitudinal axis, the base plate having a plurality of stoppers transversally-disposed on the base plate and that are spaced apart from one another along the longitudinal axis; and
a single double-sided wheel chock that is configured and disposed to cooperate with the base plate, the wheel chock including at least one substantially downwardly-projecting forward-blocking tooth and at least one substantially downwardly-projecting rearward-blocking tooth, the forward-blocking tooth and the rearward-blocking tooth being longitudinally spaced apart from one another, the wheel chock being longitudinally slidable on the base plate between a forward wheel-blocking position and a rearward wheel-blocking position when the wheel chock is placed on the base plate, the forward-blocking wheel chock tooth engaging a rear lateral surface provided on a corresponding one of the base plate stoppers and having a surface latching underneath this base plate stopper when the wheel chock is in the forward wheel blocking position to resist forces applied in a forward direction by the vehicle on the wheel chock and thereby preventing the vehicle from moving away in an unauthorized or accidental manner in the forward direction, and the rearward-blocking wheel chock tooth engaging a front lateral surface provided on a corresponding one of the base plate stoppers and having a surface latching underneath this base plate stopper when the wheel chock is in the rearward wheel blocking position to resist forces applied in a rearward direction by the vehicle on the wheel chock and thereby preventing the vehicle from moving away in an unauthorized or accidental manner in the rearward direction.

2. The restraint system as defined in claim 1, wherein the wheel chock is configured and disposed to fit in an intervening space located between two tandem wheels of the vehicle when parked.

3. The restraint system as defined in claim 1, wherein each base plate stopper includes both the rear lateral surface and the front lateral surface.

4. The restraint system as defined in claim 1, wherein the restraint system includes one among the two following features:
(1) the rear lateral surface and the front lateral surface are provided on two different ones among the stoppers, the stoppers being grouped in pairs;
(2) the rear lateral surface and the front lateral surface are provided on two different ones among the stoppers, the stoppers being grouped in pairs, the pairs of stoppers are regularly spaced from one another.

5. The restraint system as defined in claim 1, wherein the base plate is made of a plurality of sections that are aligned and juxtaposed to one another.

6. The restraint system as defined in claim 1, wherein the wheel chock includes two opposite wheel-engaging bulges.

7. The restraint system as defined in claim 1, wherein the wheel chock includes two wheel sensors.

8. The restraint system as defined in claim 1, wherein each of the lateral surfaces defines an angle of about 60 degrees with reference to the horizontal.

9. The restraint system as defined in claim 1, wherein the restraint system further includes a wheel chock repositioning cart.

10. The restraint system as defined in claim 1, wherein the restraint system is installed in a driveway.

11. The restraint system as defined in claim 1, wherein the wheel chock has a symmetrical construction with reference to a vertical transversal plane of symmetry.

12. The restraint system as defined in claim 1, wherein the stoppers are regularly spaced from one another.

13. The restraint system as defined in claim 1, wherein each stopper has a non-symmetrical cross-sectional shape.

14. The restraint system as defined in claim 1, wherein each stopper is attached to the base plate by welding the stoppers from an underside while the stoppers are partially inserted into corresponding transversal slots.

15. The restraint system as defined in claim 1, wherein the base plate includes a peripheral slanted rim.

16. The restraint system as defined in claim 1, wherein the wheel chock includes wheel sensors connected to a control unit using a wired connection.

17. The restraint system as defined in claim 1, wherein the base plate is anchored to the ground surface by fasteners.

18. The restraint system as defined in claim 1, wherein the restraint system is installed in a loading area for trucks.

19. The restraint system as defined in claim 6, wherein the wheel-engaging bulges are located at a top end of the wheel chock.

20. The restraint system as defined in claim 1, wherein the stoppers on the base plate are rectilinear and uninterrupted elongated parts.

* * * * *